United States Patent
Young

(10) Patent No.: US 8,083,624 B2
(45) Date of Patent: Dec. 27, 2011

(54) ROLLER CHAIN SPROCKET HAVING AN IMPROVED TOOTH FORM AND METAL CUSHION RINGS

(75) Inventor: James D. Young, Chesaning, MI (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 883 days.

(21) Appl. No.: 11/541,210

(22) Filed: Sep. 29, 2006

(65) Prior Publication Data
US 2007/0111833 A1   May 17, 2007

Related U.S. Application Data

(60) Provisional application No. 60/721,715, filed on Sep. 29, 2005, provisional application No. 60/834,015, filed on Jul. 28, 2006.

(51) Int. Cl.
*F16H 55/06* (2006.01)
*F16H 55/30* (2006.01)

(52) U.S. Cl. ........ 474/161; 474/100; 474/152; 474/153; 474/156

(58) Field of Classification Search .................. 474/161, 474/152–156, 160
See application file for complete search history.

(56) References Cited

U.S. PATENT DOCUMENTS

| | | | |
|---|---|---|---|
| 2,492,219 A | 4/1945 | Haefeli | |
| 2,953,930 A | 9/1960 | Meyer | |
| 3,057,219 A | 10/1962 | Montgomery | |
| 3,448,629 A * | 6/1969 | Norcross et al. | 474/148 |
| 3,523,463 A | 8/1970 | Van Thielen | |
| 4,082,372 A | 4/1978 | Kozuki | |
| 4,227,422 A * | 10/1980 | Kawashima et al. | 474/156 |
| 4,261,214 A * | 4/1981 | Watanabe et al. | 474/156 |
| 4,348,199 A | 9/1982 | Oonuma et al. | |
| 5,224,903 A | 7/1993 | Langhof et al. | |
| 5,360,378 A | 11/1994 | Suzuki et al. | |
| 5,397,278 A | 3/1995 | Suzuki et al. | |
| 6,371,874 B1 | 4/2002 | Imoue | |
| 6,419,604 B2 | 7/2002 | Saito et al. | |
| 6,652,402 B2 | 11/2003 | Poiret et al. | |
| 6,910,980 B2 | 7/2005 | Hamilton | |
| 2003/0176251 A1 * | 9/2003 | Hamilton | 474/161 |

(Continued)

FOREIGN PATENT DOCUMENTS

DE    100 25 736    12/2000

(Continued)

OTHER PUBLICATIONS

Young, James D., SAE Technical Paper Series publication titled "*Camshaft Roller Chain Drive with Reduced Meshing Impact Noise Levels*", circulated at Noise & Vibration Conference and Exhibition, Michigan, May 5-8, 2003, ISSN 0148-7191.

(Continued)

*Primary Examiner* — Robert Siconolfi
*Assistant Examiner* — San Aung
(74) *Attorney, Agent, or Firm* — Fay Sharpe LLP

(57) ABSTRACT

A cushion ring sprocket assembly and chain drive system are designed to prevent roller-to-root radial contact. Hard contact between the chain link plates and the cushion rings, and corresponding hard contact between the cushion rings and the sprocket hubs limit radial inward movement of the chain rollers/bushings, while the root surfaces of the tooth spaces are undercut so that the rollers cannot contact the root surfaces.

11 Claims, 18 Drawing Sheets

U.S. PATENT DOCUMENTS

| | | | |
|---|---|---|---|
| 2004/0185977 A1 | 9/2004 | Young et al. | |
| 2004/0204274 A1* | 10/2004 | Young | 474/156 |
| 2005/0170925 A1* | 8/2005 | Hamilton | 474/161 |
| 2006/0160648 A1 | 7/2006 | Hummel et al. | |

FOREIGN PATENT DOCUMENTS

| | | | |
|---|---|---|---|
| DE | 199 29 667 | | 1/2001 |
| DE | 199 61 046 | | 6/2001 |
| GB | 2 086 817 | | 5/1982 |
| JP | 57 186654 | | 11/1982 |
| JP | 57 190160 | | 11/1982 |
| WO | WO 03/089814 | | 10/2003 |
| WO | WO2004/059194 | * | 7/2004 |
| WO | WO 2004/059194 | | 7/2004 |

OTHER PUBLICATIONS

International Standard ISO 606:2004(E), 2004.
International Preliminary Report on Patentability, Application No. PCT/US2006/038060.

* cited by examiner

ROLLER CHAIN SPROCKET HAVING AN IMPROVED TOOTH FORM AND METAL CUSHION RINGS

CROSS-REFERENCE TO RELATED APPLICATIONS

This application claims priority from and benefit of the filing date of U.S. provisional application Ser. No. 60/721,715 filed Sep. 29, 2005 and U.S. provisional application Ser. No. 60/834,015 filed Jul. 28, 2006, and both of said provisional applications are hereby expressly incorporated by reference into the present specification.

BACKGROUND

Sprockets incorporating metal cushion rings have been used in automotive engine roller chain drive systems such as camshaft and balance shaft drives. The purpose of the cushion rings is to buffer or soften the roller-sprocket collision at the onset of meshing, thereby acting to reduce the chain meshing noise levels associated with roller chain drive systems. Roller-sprocket impact at the onset of meshing is the dominant noise source associated with roller chain drive systems and it occurs when a chain link leaves the span and its meshing roller collides with the sprocket tooth at engagement. It is believed that multiple roller-sprocket tooth impacts occur during the meshing phenomena and these impacts contribute to the undesirable noise levels associated with roller chain drives. There will be at least two impacts at the onset of meshing, a radial impact as the roller collides with the root surface and a tangential impact as the roller moves into driving position. It is believed that radial impact(s) will occur first, followed closely by tangential impact(s).

FIGS. 1 and 1A illustrate a conventional roller chain drive system 10 which is comprised of a cushion ring sprocket assembly 15, a roller chain 40, and at least one other sprocket (not shown). The roller chain 40 is conventional and includes a plurality of roller link assemblies, each comprising a pair of spaced-apart rollers 50 (i.e., rollers 50a, 50b, 50c, etc.) captured between a pair of parallel roller link plates 46, and the roller link assemblies are interconnected to each other in an endless fashion by pin link plates 48 located on opposite sides of the roller link assemblies. Each roller 50 is rotatably supported on a bushing (not shown) that spans the space between the roller link plates 46 and that is press-fit at its opposite ends into aligned apertures respectively defined in the roller link plates 46. The term "roller" as used herein is intended to encompass any rotating or non-rotating component located between the roller link plates 46 and intended to drivingly engage the sprocket 20, e.g., a roller supported on a bushing or a non-rotating bushing alone, without any rolling member supported thereon (also referred to in the art as a "bush chain"). Pins 42 are located in aligned apertures in the pin link plates 48 and roller link assemblies to pivotally interconnect the roller link assemblies. Each aligned pair of roller link plates 46 and the rollers 50 located therebetween defines a "roller link assembly" and is sometimes referred to herein as a "roller link row 45." Each aligned pair of pin link plates 48 defines a "pin link row 47." The chain link plates 46, 48 define a link plate height $H_P$ between upper and lower link edges E1, E2. The rollers 50 are centered halfway between the link plate edges E1, E2.

With reference also to FIG. 1B, the relevant components and features of a conventional cushion ring sprocket assembly 15 include a sprocket body 20 defined as a one-piece or multi-piece construction from steel or the like and having a full-circle complement of symmetrical sprocket teeth 22 manufactured according to an ISO 606:2004(E) standard or other symmetrical standard tooth forms as are typically used for automotive roller chain sprockets, first and second sprocket hubs 25a, 25b (that are part of the body 20) extending axially from the opposite first and second axial tooth faces/walls 21a, 21b, cushion rings 30 eccentrically mounted on the respective first and second hubs 25a, 25b, and circlip-type rings 32 or other means (not shown in FIG. 1 for clarity) to axially retain the cushion rings. A central bore or other recess B (also not shown in FIG. 1 for clarity) is defined in the sprocket body 20 and is adapted to receive a shaft or other rotating member that drives or that is driven by the sprocket body 20. The sprocket body 20 rotates about an axis of rotation L. The cushion ring 30 shown in FIG. 1 is in its free circular state, but there will be a combination of ring "lift" and "deflection" in normal engine operation as a function of chain tension and strand dynamics. "Lift" is defined as the distance that a cushion ring will lift or displace the next-meshing link row from its normal path during meshing and it effectively serves to lessen the effect of chordal action (see FIG. 2C); "deflection" is defined as deformation or ovalization of the cushion rings 30 under the force of chain tension.

FIG. 1A is a section view that illustrates the relationship of the meshing roller link row 45d, to the cushion rings 30 with the roller link plates 46 of roller link row 45d shown to be in hard contact with—and deflecting—the cushion rings. With a conventional system 10, the roller 50 is in hard root contact with the root surface 24 defined between successive sprocket teeth 22 as shown at RC, i.e., the cushion rings 30 can be deflected sufficiently to allow a roller 50 to make radial contact with the root surface 24 defined between successive sprocket teeth 22.

It is important to note that the chain link pitch P for a minimum as-manufactured roller chain 40 will be equal to the chordal pitch P for a roller chain sprocket 20 having a maximum as-manufactured tooth form. As is well known in the art, this equality for chain pitch P and sprocket chordal pitch P exists only at the aforementioned limits of the manufacturing tolerance range, and as the relevant chain and sprocket tolerances vary toward the opposite end of their respective manufacturing limits, there will be a pitch mismatch between chain link pitch which is more specifically designated $P_C$ and sprocket chordal pitch which is more specifically designated $P_S$, with $P_C > P_S$. In other words, chain link pitch $P_C$ will always be greater than sprocket chordal pitch $P_S$ except at the specified manufacturing tolerance limit as noted. For the purpose of the included figures, chain link pitch is equal to sprocket chordal pitch, and accordingly, all rollers in the wrap angle θ for the conventional cushion ring sprockets will contact the root surface 24 of sprocket teeth 22 at the root diameter RD (see FIG. 2A) and the roller centers will be on the theoretical pitch diameter PD. It should be noted, however, that the tangential impact as the meshing roller moves into driving position, although still occurring on the root radius for the indicated build stack condition, will occur slightly radially outward of the root diameter toward the engaging flank.

As shown in FIG. 1 and more clearly in FIG. 2A, a greatly enlarged view of FIG. 1, a roller 50a is at a 12 o'clock position and roller 50b of roller link row 45d is the next roller to mesh with the sprocket 20. FIGS. 2A-2C illustrate the progression of roller link assembly row 45d in the chain free span as sprocket 20 rotates in a clockwise direction until roller 50b as shown in FIG. 2C is at the instant of radial meshing impact $I_R$. The roller link plates 46 of roller link row 45d must deflect cushion rings 30 a distance L1 in order for the roller 50b to make radial meshing impact $I_R$ with the root surface 24.

Referring now to FIG. 3, a larger view of the FIG. 2C sprocket rotation, ring deflection L1 at the entry and L2 at the exit of wrap angle θ will be substantially equal. Also, there will be a clearance 55 defined between the inside edges of pin link plates 48 of pin link row 47a and the cushion rings 30 in the area of mid-wrap 35 where the cushion rings 30 are shown to be in hard contact with the hub surfaces 25a, 25b. The inside diameter of cushion rings 30 is larger than the outside diameters of hubs 25a, 25b, and noise attenuation is achieved as a function of the aforementioned ring deflection during meshing, with the rings 30 absorbing a portion of the meshing impact energy as the rings are deformed from their circular shape, as illustrated by the deflections L1 and L2 in FIG. 3. Accordingly, the inner edges of the chain link plates 46, 48 will be in hard contact with the cushion rings 30 for one or more link rows 45, 47 at the entry and the exit portions of the wrap angle θ, as shown, but the inner edges of the chain link plates 46, 48 do not contact the rings 30 through the entire wrap angle θ (as indicated by the space 55 in FIG. 3). The metal cushion rings 30 must be compressed a distance L1 in order for the rollers 50a, 50b to achieve initial radial meshing impact $I_R$ and continued roller-root surface contact RC, and the component geometry will permit this roller-to-root surface contact.

This initial radial meshing impact $I_R$ is normally the major contributor to the overall chain drive noise level, and the utilization of a conventional metal cushion ring sprocket notwithstanding, radial meshing impacts will still occur—albeit reduced impacts—along with the corresponding objectionable noise levels associated with roller-sprocket meshing impacts. Accordingly, it has been deemed desirable to develop a new and improved cushion ring sprocket to further reduce the noise levels associated with roller chain drives.

SUMMARY

In accordance with one aspect of the present invention, a sprocket assembly includes a body including a ring of teeth and first and second hubs that project axially outward relative to opposite first and second faces of the ring of teeth. The first and second hubs define respective first and second outside diameters each having a radius HR, and the ring of teeth includes N teeth separated from each other by respective tooth spaces. Each tooth includes engaging and disengaging flanks, wherein respective root surfaces are located between engaging and disengaging flanks of successive teeth. The sprocket body is adapted to mesh with an associated roller chain having a link plate height $H_P$ and a pitch P such that said sprocket body defines a pitch diameter PD and a pitch chord radius $R_C$. First and second sets of metal cushion rings are eccentrically captured on the first and second hubs, respectively. The first and second sets of cushion rings each have a radial thickness RT. The sprocket assembly satisfies the relationships:

$$HR = R_C - RT - \frac{H_P}{2}$$

and, $$R_C = \frac{\sqrt{(PD)^2 - P^2}}{2}$$

and, $$PD = \frac{P}{\sin(180/N)}$$

wherein said root surfaces are undercut so that rollers/bushings of the associated chain cannot contact the root surfaces.

In accordance with another aspect of the present invention, a chain drive system includes a sprocket assembly with a body including a ring of teeth and first and second hubs that project axially outward relative to opposite first and second faces of the ring of teeth. The first and second hubs define respective first and second outside diameters. The ring of teeth includes a plurality of teeth separated from each other by respective tooth spaces. The teeth each include engaging and disengaging flanks, wherein respective root surfaces are located between engaging and disengaging flanks of successive teeth. First and second sets of metal cushion rings are eccentrically captured on the first and second hubs, respectively. A chain is drivingly engaged with the sprocket assembly. The chain includes: (i) first and second rollers located in first and second tooth spaces and fully meshed with said sprocket assembly; and, (ii) first and second roller link plates between which said first and second rollers are located. The first and second roller link plates include respective first and second link plate inner edges. The first and second sets of cushion rings position said first and second roller link plates such that first and second clearances are defined between said first and second fully meshed rollers and first and second root surfaces of the first and second tooth spaces, respectively.

In accordance with another aspect of the present invention, a method of meshing a chain with a sprocket assembly includes: rotating a sprocket body of the sprocket assembly such that successive roller link rows of a roller chain move into engagement with the sprocket body; contacting first and second roller link plates of each successive roller link row with first and second eccentric metal cushion ring sets of the sprocket assembly, respectively, to radially position first and second rollers of each successive roller link row in first and second tooth spaces as the roller link row moves into and through a wrap angle; limiting radial inward movement of the first and second rollers of each successive roller link row by hard contact between the first and second roller link plates and the first and second cushion ring sets, and by hard contact between the first and second eccentric cushion ring sets with respective first and second hubs such that first and second clearances are defined between the first and second rollers and respective first and second root surfaces of the first and second tooth spaces for all positions of the roller link row in the wrap angle.

In accordance with another aspect of the present invention, a sprocket assembly includes a body including a ring of teeth and first and second hubs, the first and second hubs defining respective first and second outside diameters, and the ring of teeth comprising a plurality of teeth separated from each other by respective tooth spaces. The teeth each include an engaging and disengaging flank, wherein respective root surfaces are located between engaging and disengaging flanks of successive teeth. First and second metal cushion rings are eccentrically captured on the first and second hubs, respectively. The first and second hubs and said first and second metal cushion rings are dimensioned to radially position an associated chain on the body, wherein said root surfaces are undercut such that rollers/bushings of the associated chain cannot contact said root surfaces.

BRIEF DESCRIPTION OF DRAWINGS

The invention comprises various components and arrangements of components, preferred embodiments of which are illustrated in the accompanying drawings wherein.

DETAILED DESCRIPTION OF THE INVENTION

Figure 1:
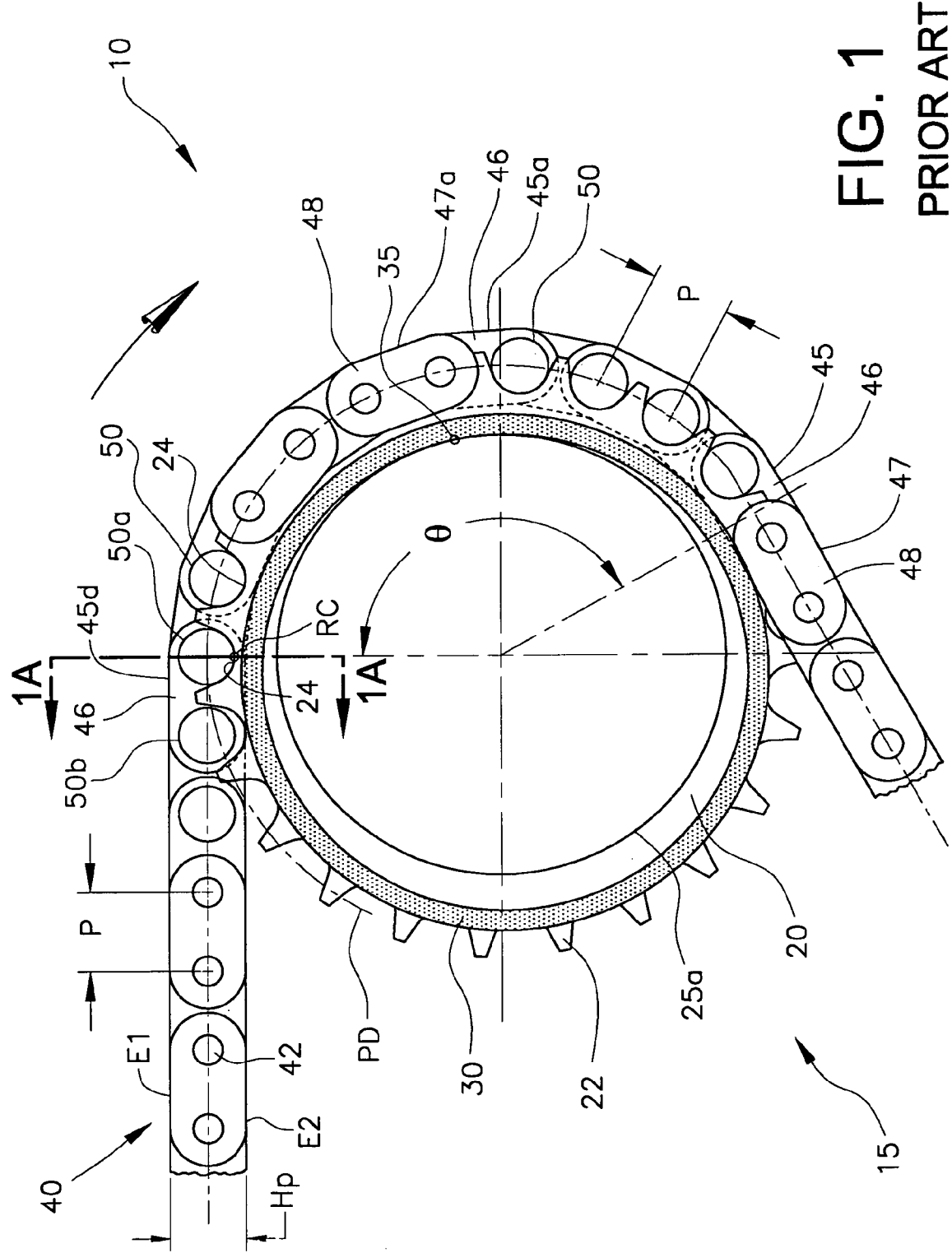
FIG. 1 is a partial front elevational view of a chain drive system having a conventional sprocket assembly with metal cushion rings (certain portions of the sprocket assembly and certain links of the chain are not shown in order to reveal underlying structure)
Figure 1A:
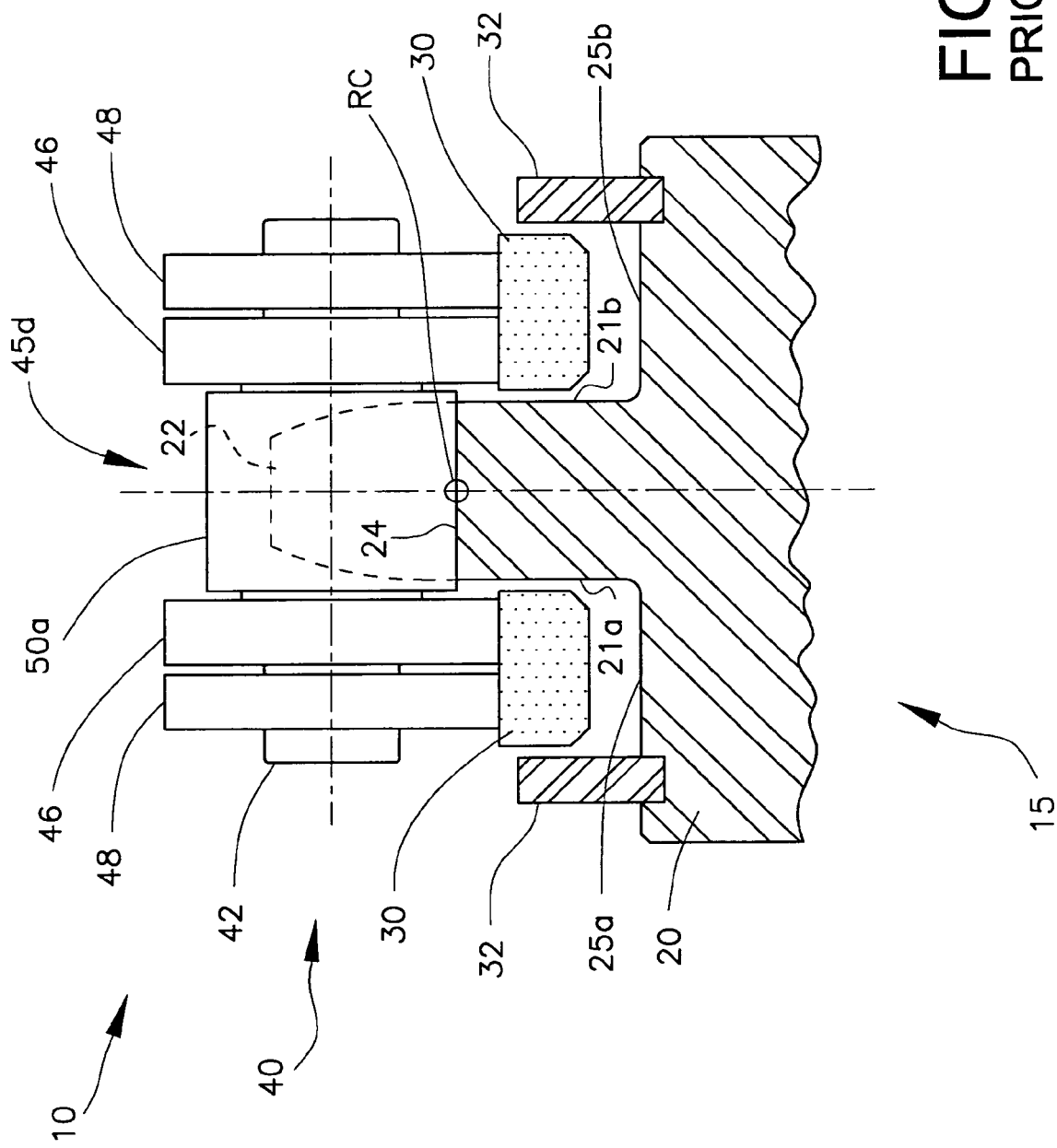
FIG. 1A is a section view of the sprocket and chain of FIG. 1 to show the relationship of the chain and metal cushion rings during meshing.

The present invention is directed to an improved cushion ring sprocket system 110 and/or sprocket assembly 115 to provide reduced roller chain drive meshing noise levels. Except as otherwise shown and/or described, the system 110, chain 140 and sprocket assembly 115 are identical to the system 10, chain 40 and sprocket assembly 15 described above, and corresponding components are identified with reference numbers that are 100 greater than those used above.

Figure 4:
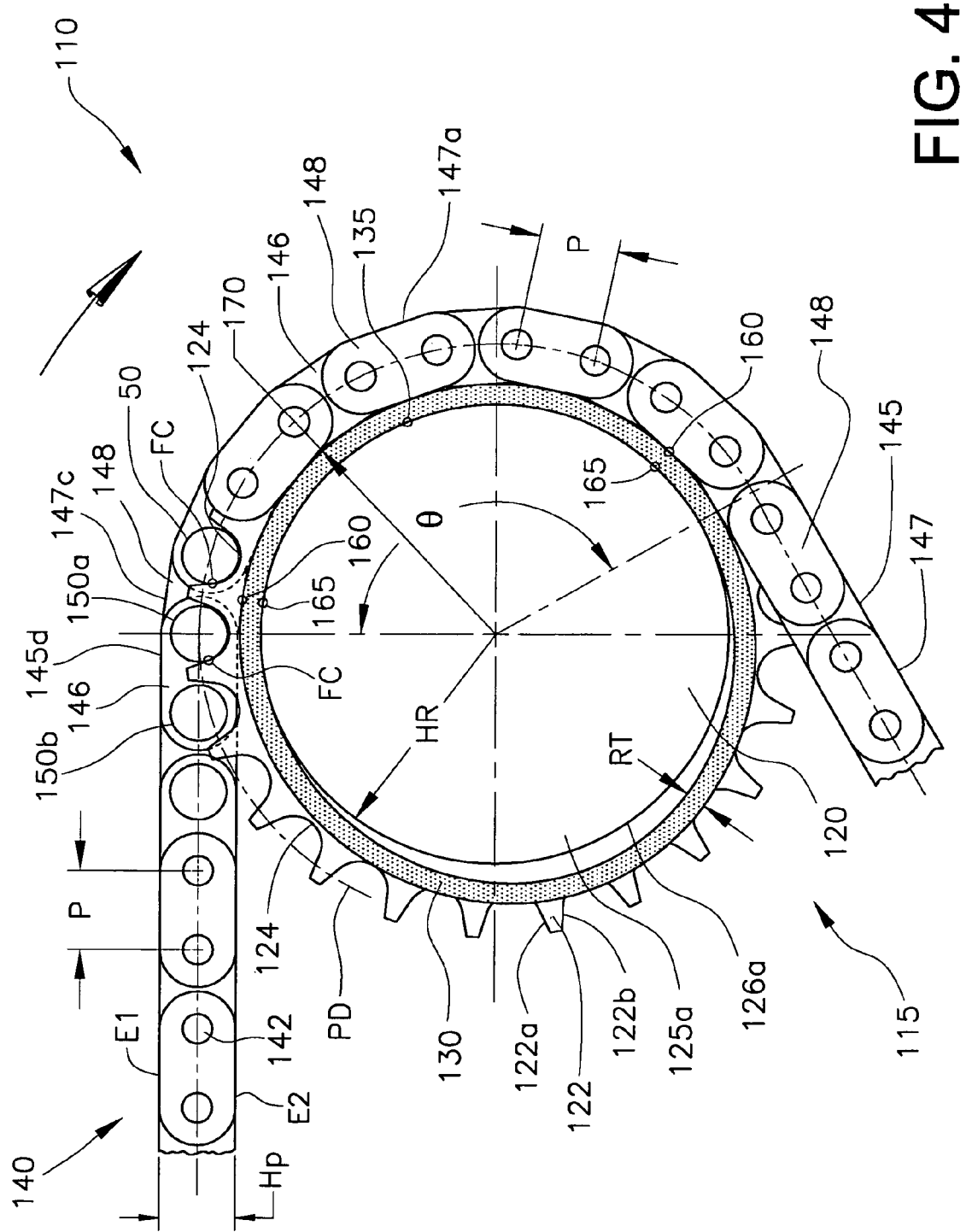
FIG. 4 is a front elevational view of a chain drive system having a metal cushion ring sprocket assembly formed in accordance with the present invention (certain portions of the sprocket assembly and certain links of the chain are not shown in order to reveal underlying structure)

Referring to FIG. 4, the roller chain drive system 110 comprises at least a sprocket assembly 115 and at least one other sprocket (not shown) and a roller chain 140 meshed with the sprocket assembly 115 at the one or more other sprockets. The roller chain 140 is conventional and includes a plurality of roller link assemblies, each comprising a pair of spaced-apart rollers 150 (i.e., rollers 150a, 150b, 150c, etc.) captured between a pair of roller link plates 146, and the roller link assemblies are interconnected in an endless fashion by pin link plates 148 located on opposite sides of the roller link assemblies. Each roller 150 is rotatably supported on a bushing (not shown) that spans the space between the roller link plates 146 and that is press-fit at its opposite ends into aligned apertures respectively defined in the roller link plates 146. The term "roller" as used herein is intended to encompass a roller 150 or, alternatively, a non-rotating component located between the roller link plates 146 and intended to drivingly engage the sprocket 120, e.g., a non-rotating bushing alone, without any rolling member supported thereon (also referred to in the art as a "bush chain"). Pins 142 are located in aligned apertures in the pin link plates 148 and roller link assemblies to pivotally interconnect the roller link assemblies. Each aligned pair of roller link plates 146 and the rollers 150 located therebetween defines a "roller link assembly" and is sometimes referred to herein as a "roller link row 145." Each aligned pair of pin link plates 148 defines a "pin link row 147."

As described above in relation to the conventional cushion ring sprocket assembly, those of ordinary skill in the art will recognize that the chain link pitch P for a minimum as-manufactured roller chain 140 will be equal to the chordal pitch P for a roller chain sprocket 120 having a maximum as-manufactured tooth form. As is also well known in the art, this equality for chain pitch P and sprocket chordal pitch P exists only at the aforementioned limits of the manufacturing tolerance range and, as the relevant chain and sprocket tolerances vary toward the opposite end of their respective manufacturing limits, i.e., as the chain link pitch P (which is more specifically designated $P_C$) lengthens relative to its theoretical minimum and as the sprocket chordal pitch P (which is more specifically designated $P_S$) shortens relative to its theoretical maximum there will be a pitch mismatch between chain link pitch $P_C$ and sprocket chordal pitch $P_S$, with $P_C > P_S$. In other words, chain link pitch $P_C$ will always be greater than sprocket chordal pitch $P_S$ except at the specified manufacturing tolerance limit as noted. For the purpose of the included figures, chain link pitch $P_C$ is shown to be equal to sprocket chordal pitch $P_S$. Also, a roller 150 is deemed to be fully meshed and seated in its driving position when its center is located on the pitch diameter PD and when the roller 150 is making flank contact FC with an engaging flank 122a of a tooth 122.

Figure 1B:
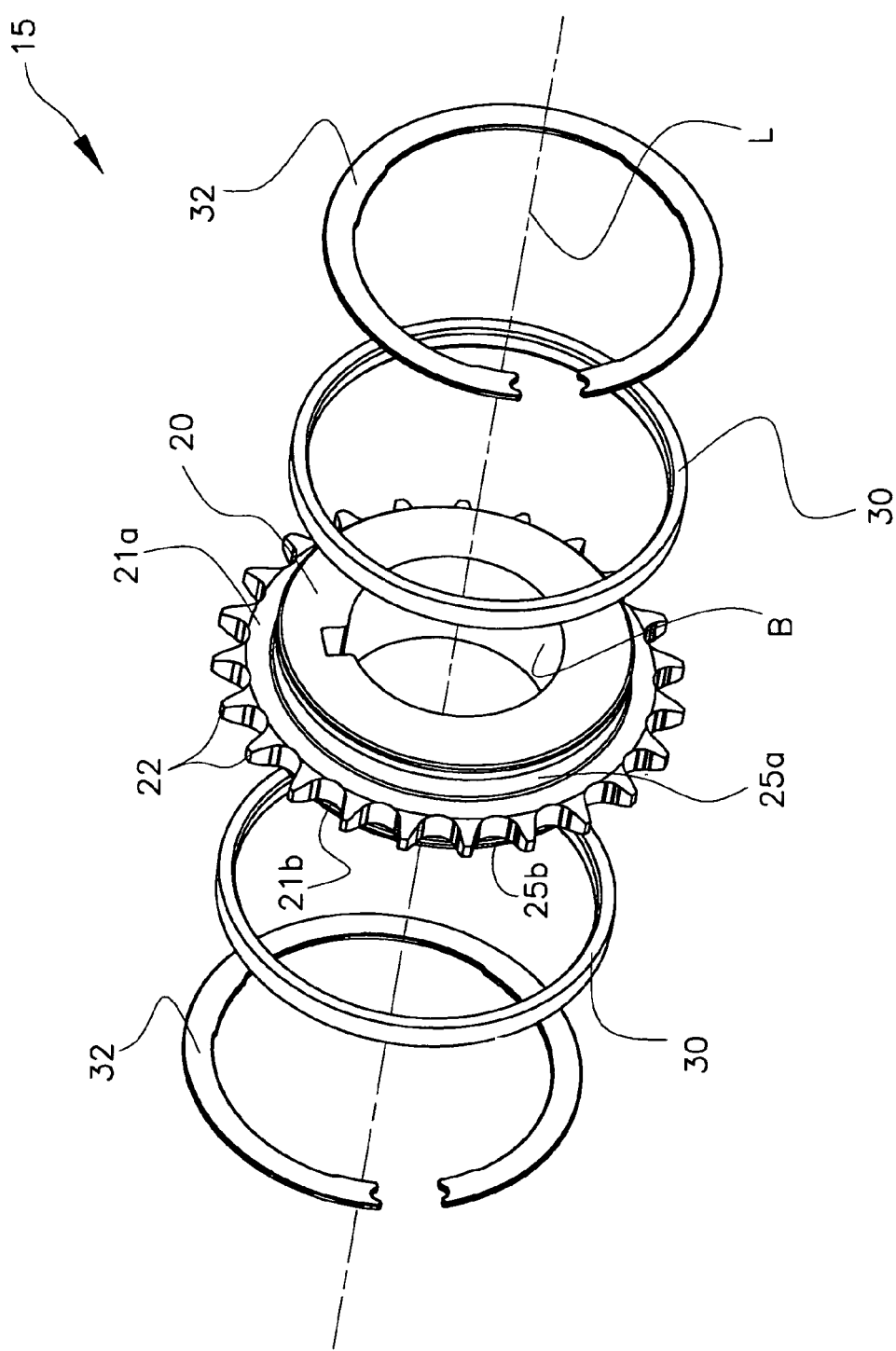
FIG. 1B is an exploded isometric view of the conventional cushion ring sprocket assembly of FIGS. 1 and 1A.

Except as otherwise shown and/or described herein, the sprocket body 120 is identical to the conventional sprocket body 20 disclosed above and such conventional features of the sprocket body 120 are not necessarily detailed again in this detailed description. In particular, it is noted that the sprocket body 120 includes a recess or bore B as shown in FIG. 1B for the conventional sprocket body 20, but the recess/bore is not shown in FIGS. 4, 4A in an effort to clarify the drawings. Each tooth 122 comprises an engaging (drive) flank 122a and a disengaging (coast) flank 122b. Each engaging flank 122a is connected to a preceding tooth's disengaging flank 122b by a root surface 124. The tooth form of sprocket teeth 122, although symmetrical for the embodiment shown in FIGS. 4-5D, is not a standard tooth form and, instead, includes sufficient undercutting (radial inward shifting) of the root surfaces 124 (and optionally also chordal pitch reduction), relative to a conventional tooth form such as an ISO 606:2004(E) tooth form, such that when combined with a hub radius HR of the hubs 125a, 125b and the cushion ring radial thickness RT relationship as further defined below, there is no roller-sprocket radial impact $I_R$ or subsequent roller-to-root contact RC occurring either during the meshing phenomena or following meshing as the rollers travel around the sprocket wrap. Although the teeth 122 are shown as symmetrical teeth, the teeth 122 can alternatively be defined with one or a combination of asymmetric tooth profiles based upon, e.g., those disclosed in the following U.S. Patent documents, and the disclosures of all of these patent documents are hereby expressly incorporated by reference herein: (i) U.S. Pat. No. 6,371,875; (ii) U.S. Pat. No. 6,325,734; (iii) U.S. Pat. No. 6,179,741; (iv) U.S. Pat. No. 6,090,003; (v) U.S. Pat. No. 5,997,424; (vi) U.S. Pat. No. 5,993,344; (vii) U.S. Pat. No. 5,976,045; (viii) U.S. Pat. No. 5,921,879; (ix) U.S. Pat. No. 5,921,878; and, (x) U.S. Pat. No. 5,876,295, but also including the aforementioned undercut root feature which is described in further detail below.

Referring still to FIG. 4, a swing radius 170 is defined by the inscribed radius tangent to the respective radial inner edges E2 of the link plates 146, 148 (at the mid-point) of link rows 145, 147 of roller chain 140 within the sprocket 120 wrap angle θ when the roller chain segment included in the wrap angle θ is positioned radially such that the centers of the rollers 150 lie on the sprocket theoretical pitch diameter PD. This "radial positioning" of the link rows 145, 147 in the wrap is accomplished by the dimensional relationship of the radius HR of the sprocket hubs 125a, 125b and radial thickness RT of the cushion rings 130, such that: HR+RT=swing radius 170, with HR and RT at dimensional maximums. The hub radius HR is typically larger than the hub radius of a conventional sprocket body 20.

Figure 5A:
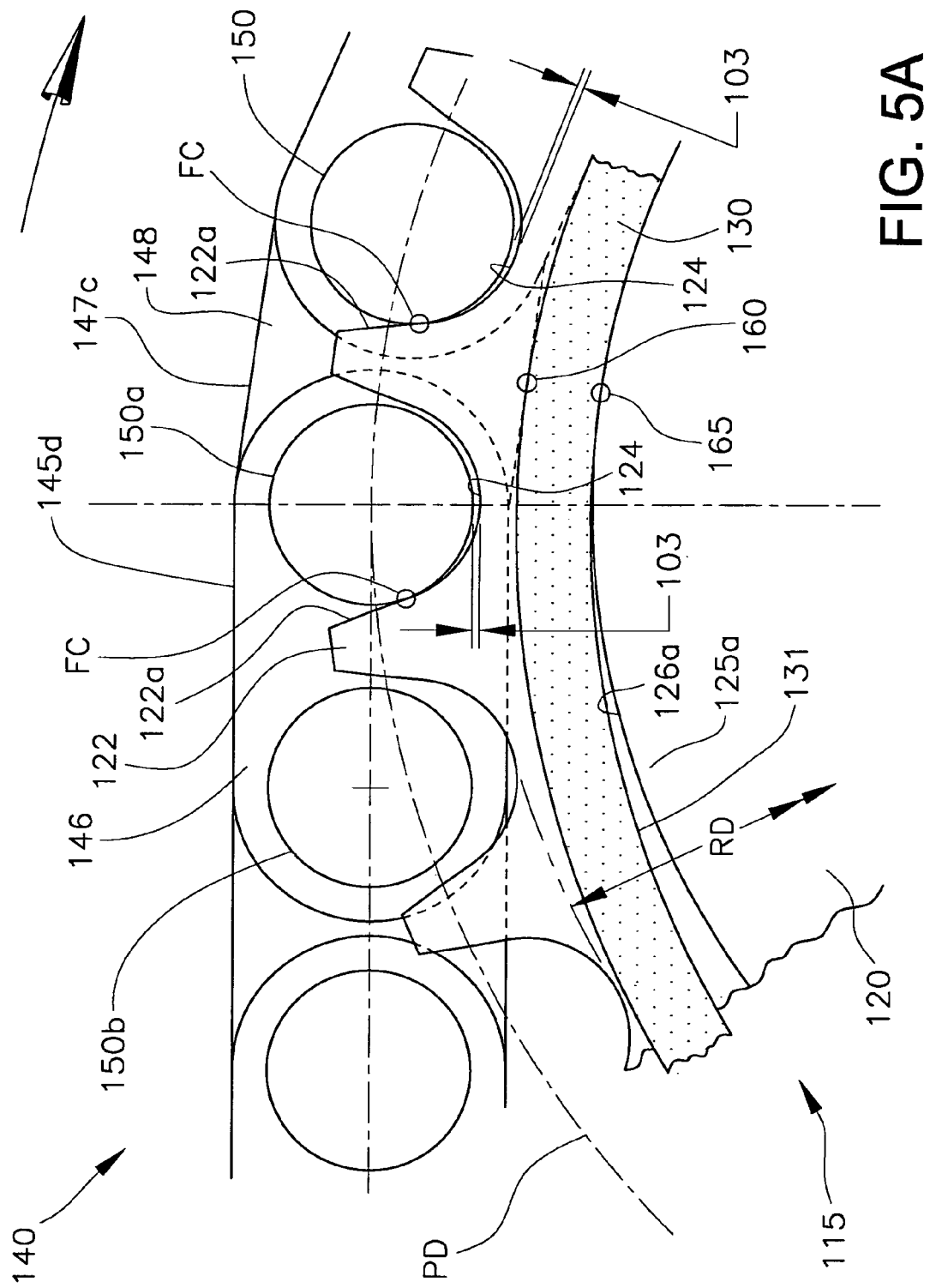
FIG. 5A is an enlarged portion of FIG. 4 showing the meshing relationship of the chain and sprocket.
Figure 5B:
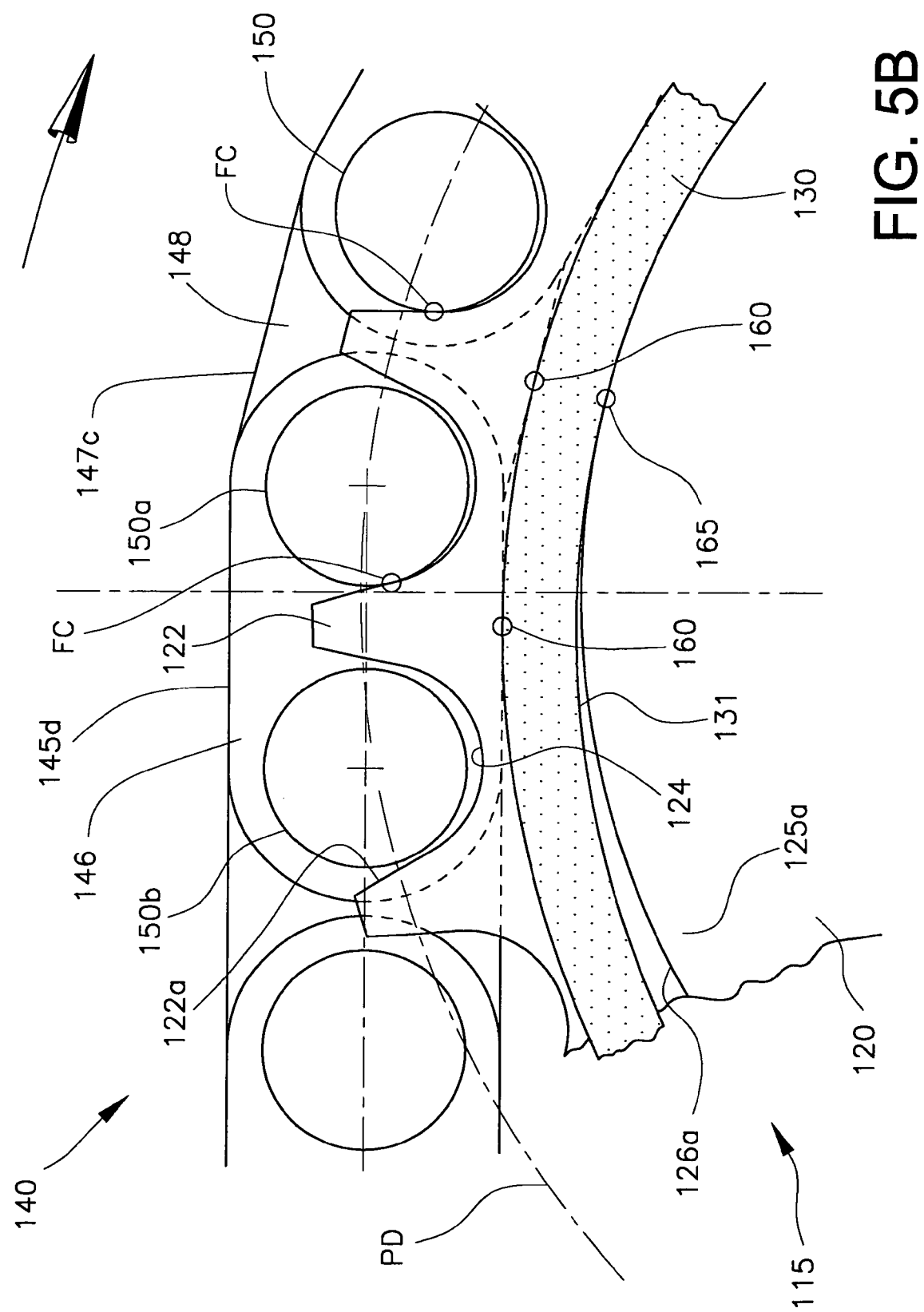
FIGS. 5B-5C are enlarged views similar to FIG. 4 and showing the chain in successive stages of engagement with the sprocket relative to FIG. 5A.
Figure 5C:
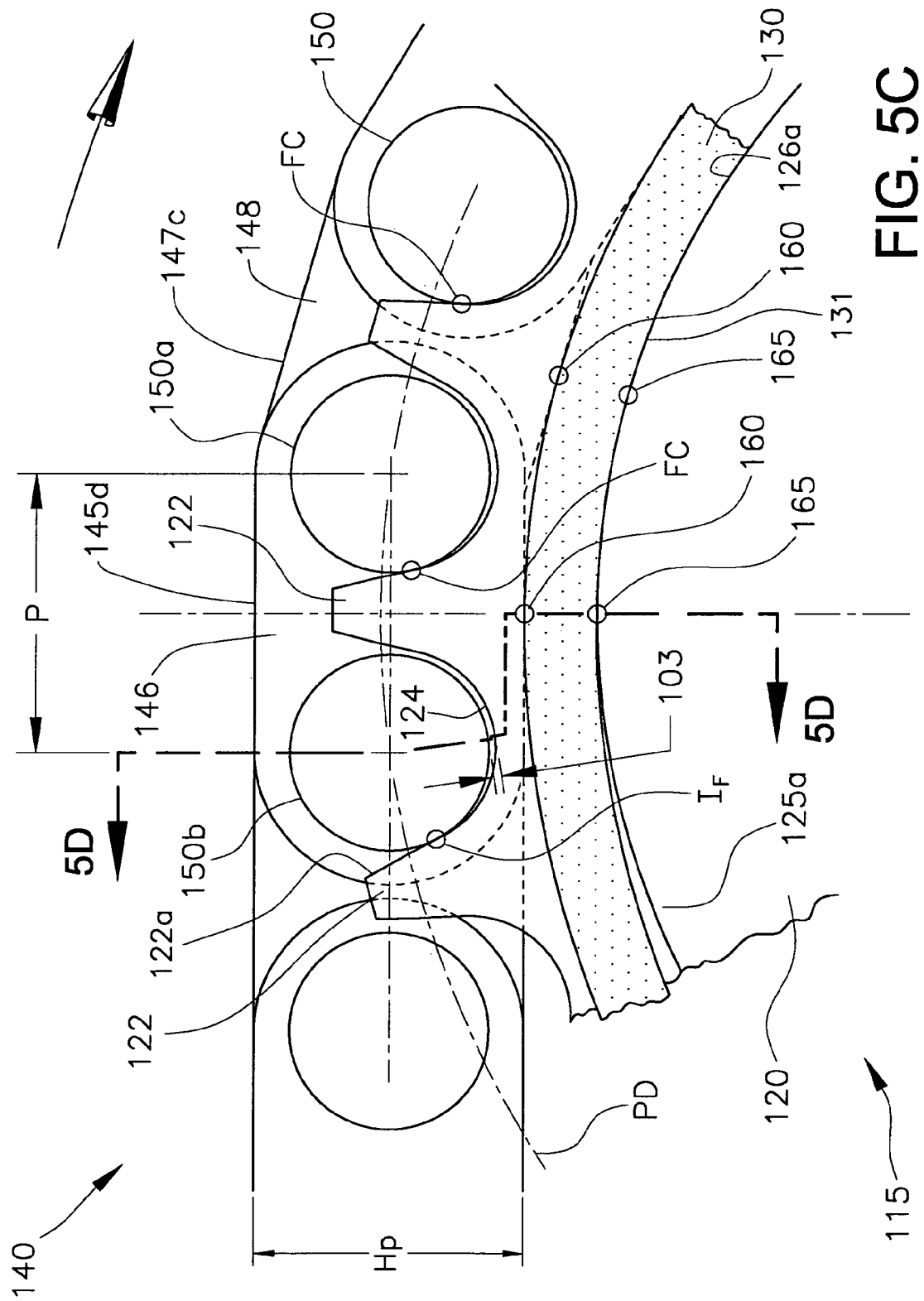

The sprocket assembly 115 comprises first and second cushion rings 130 manufactured from a metal such as bearing-grade steel that float eccentrically on first and second hubs 125a, 125b adjacent first and second opposite tooth faces/walls 121a, 121b (FIG. 5D) of the sprocket body 120, which is, itself, made from any suitable steel alloy as is known in the art as a one-piece or multi-piece construction, e.g., using a powdered metal process. The cushion ring 130 shown in FIG. 4 is deflected sufficiently to allow the approaching chain in the free span to follow its normal path and the roller-sprocket meshing will occur with the roller centers on the pitch diameter PD as the rollers move into the wrap. The other cushion ring 130, located adjacent the second axial tooth face 121b of the sprocket body 120 (see FIG. 5D), is structured and performs as shown and described herein with respect to the cushion ring 130 shown in FIG. 4. In FIGS. 5A-5C, the cushion rings 130 (shown as partial ring segments) are also deflected.

Figure 2A:
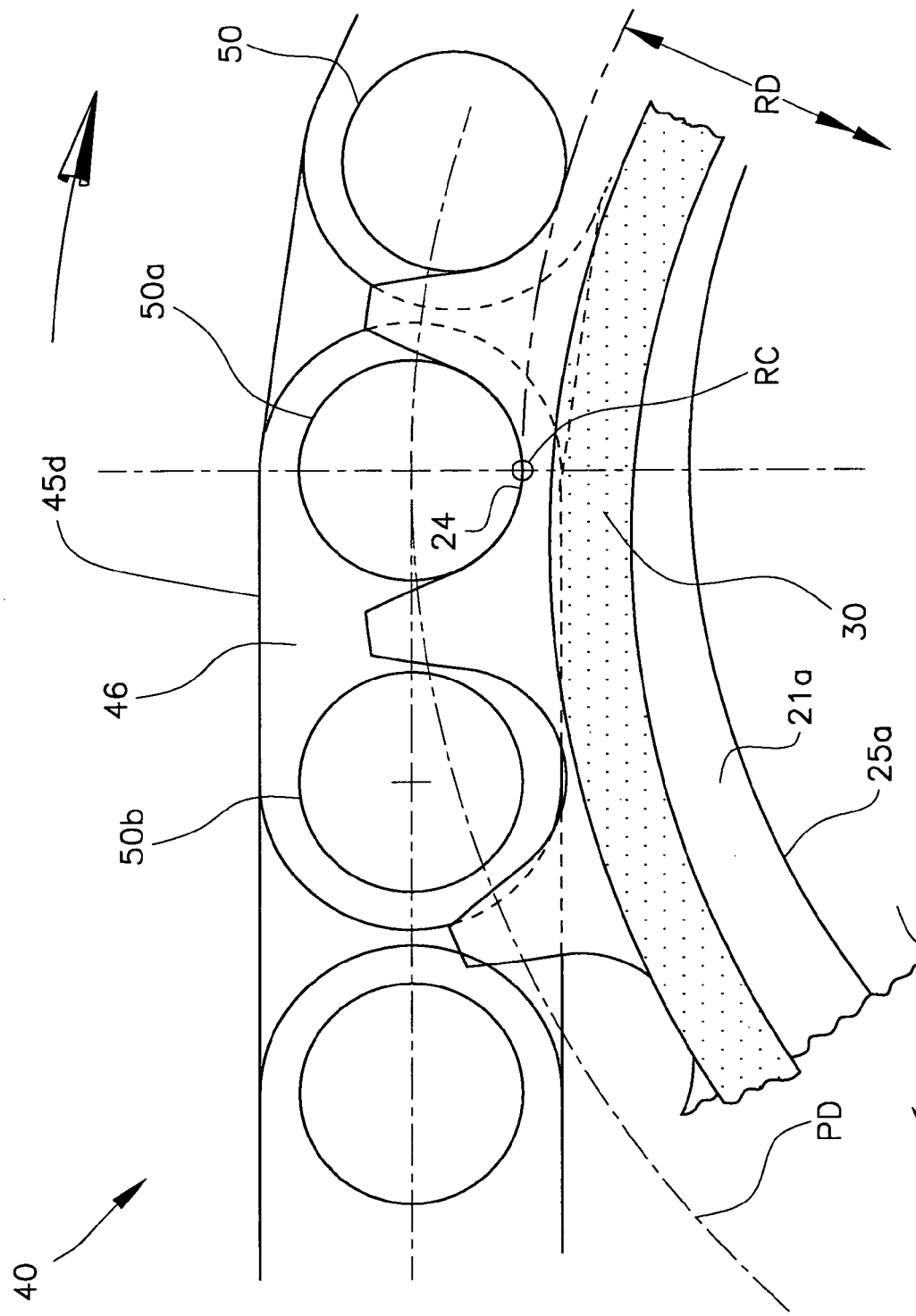
FIG. 2A is an enlarged partial illustration of FIG. 1 showing the meshing relationship of the chain and sprocket.
Figure 2B:
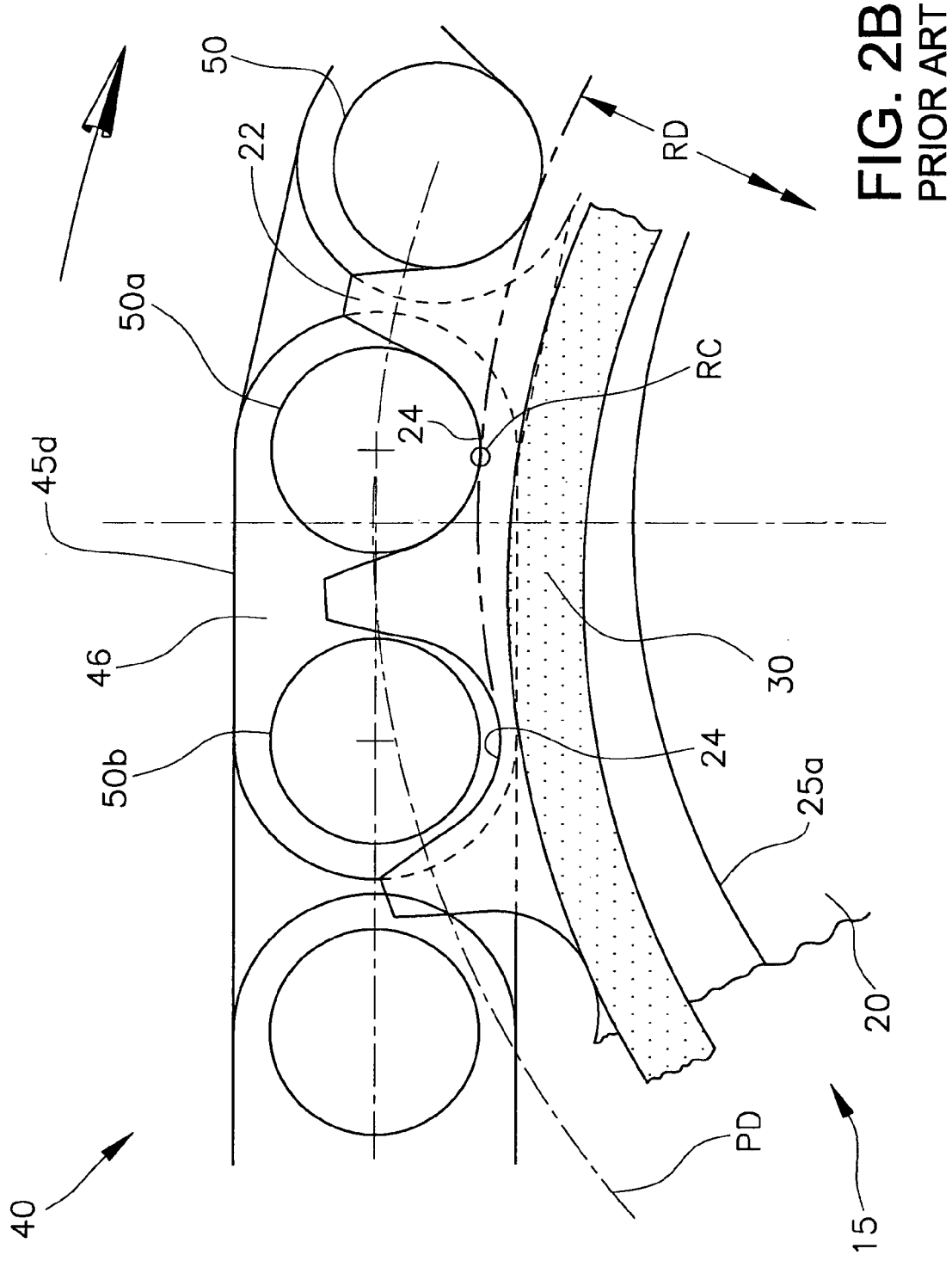
FIGS. 2B-2C are enlarged views of the chain drive system of FIG. 1 with the chain in successive stages of engagement with the sprocket.
Figure 2C:
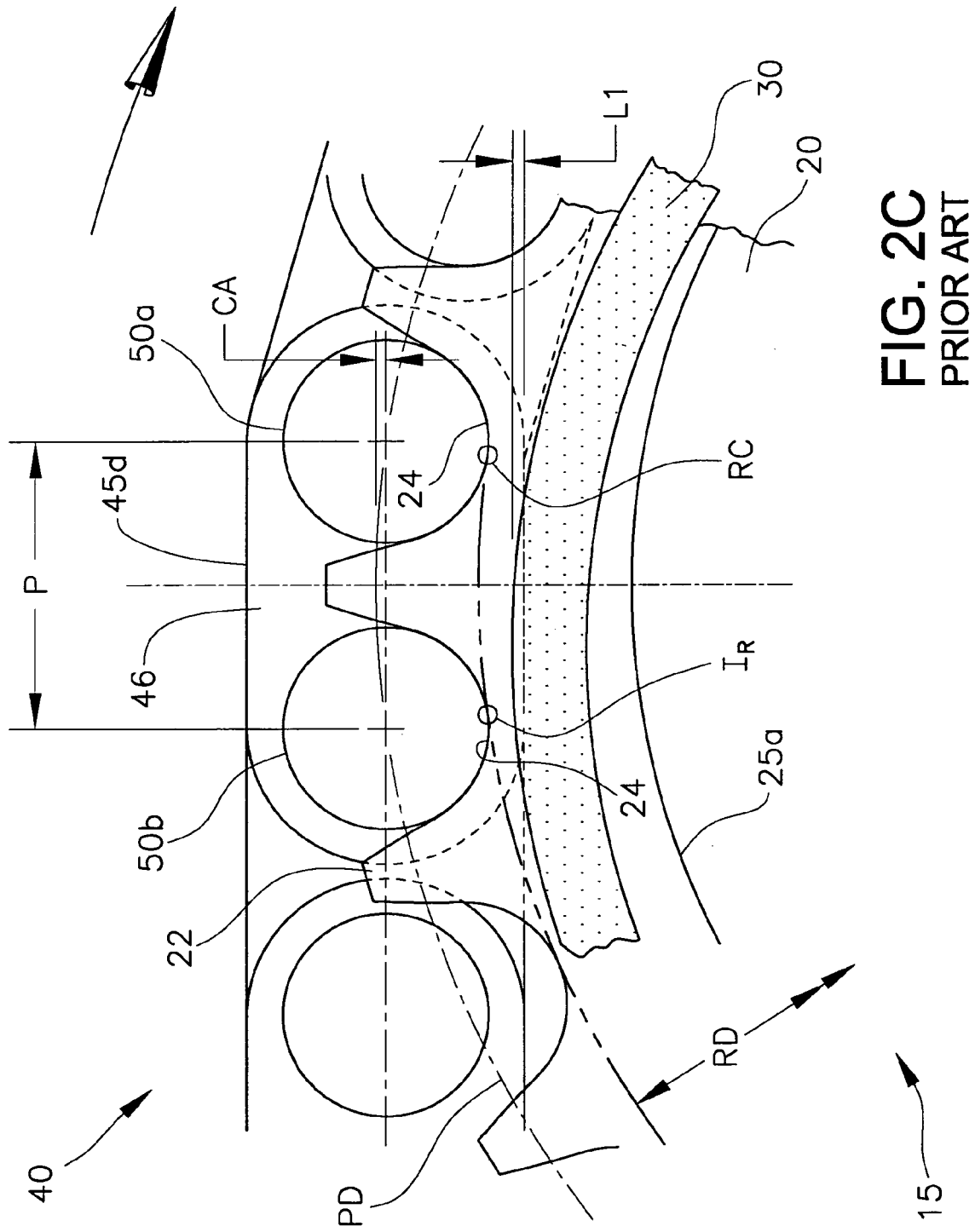
Figure 3:
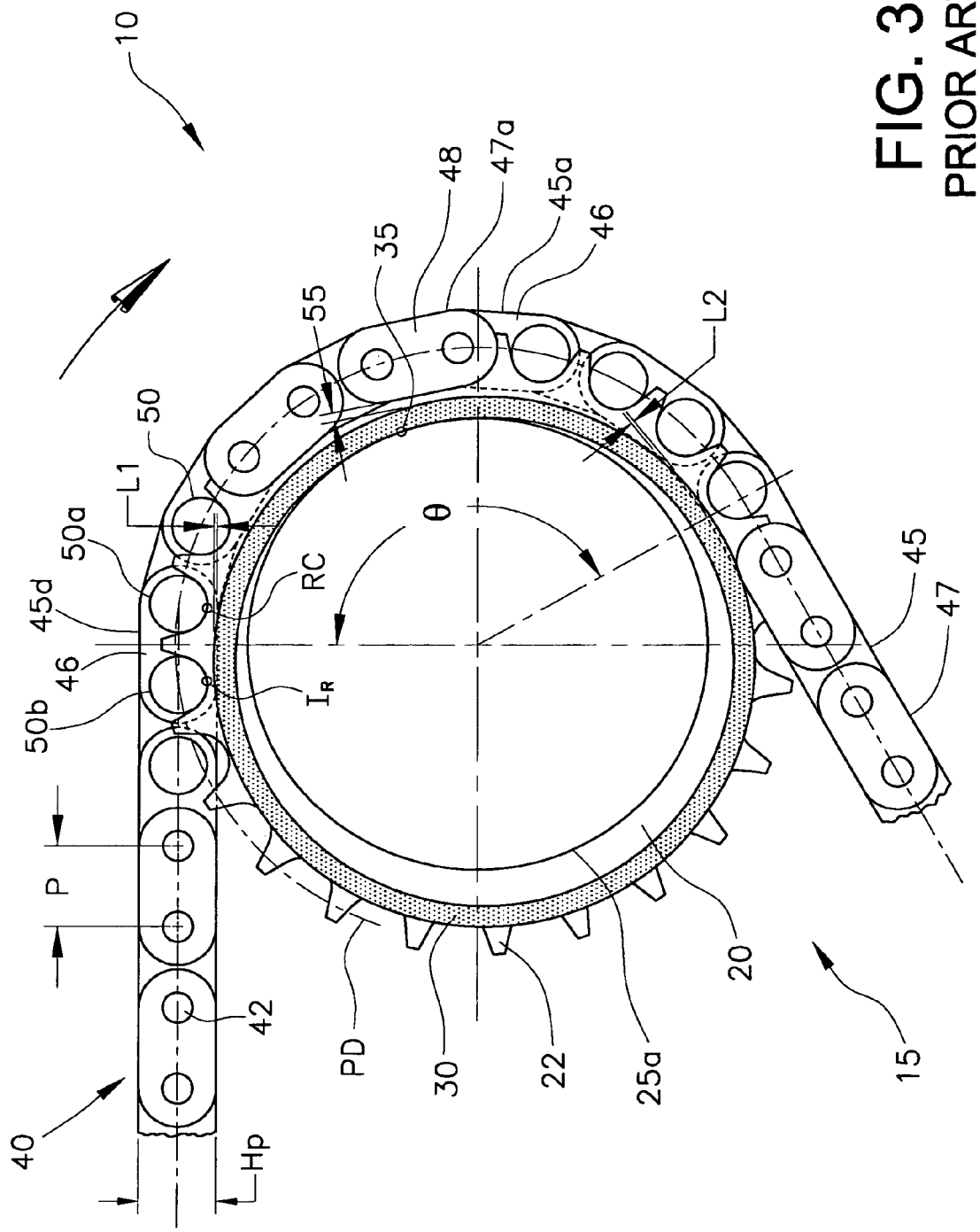
FIG. 3 is a full view that corresponds to FIG. 2C and showing greater detail.

Referring now to FIG. 5A, rollers 150 and 150a are fully meshed with the sprocket assembly 115, i.e., the centers of rollers 150, 150a are located on the pitch diameter PD and the rollers 150, 150a are in driving contact with respective engaging flanks 122a as indicated at locations FC. In accordance with the present invention, fully meshed rollers such as the rollers 150, 150 cannot make initial radial impact $I_R$ (FIG. 2C) or subsequent radial contact RC (FIG. 2C) with the respective root surfaces 124. This leads to the presence of a roller-root clearance 103 for the rollers 150, 150a when they are in the wrap θ, i.e., spaces 103 are defined between the fully-meshed rollers 150, 150a and respective sprocket root surfaces 124 in the wrap θ. With specific reference to the roller 150a, it is shown at a 12 o'clock position in the wrap θ in FIG. 5A, and shown at subsequent locations in FIGS. 5B and 5C as the sprocket body rotates relative to the position shown in FIG. 5A. As illustrated in the meshing sequence of FIGS. 5A-5C, a sprocket assembly 115 formed in accordance with the present development does not permit any radial roller-root contact for the roller 150a or any other roller 150 in the wrap θ. The clearance 103 defined between the roller 150a and the root surface 124 results from the tooth form root undercut which effectively moves the root surface 124 radially inward relative to a conventional tooth form that would allow a roller to contact with the root surface when the roller center is located at the pitch diameter. Furthermore, hard contact 160 between the pin link plates 148 of pin link row 147c (at their mid-points) and the cushion rings 130 at their outside diameters, combined with the hard contact between the cushion ring inside diameters 131 and hubs 125a, 125b at locations 165 that are radially aligned with respective locations 160 prevent the center of the roller 150a from moving radially inward relative to the pitch diameter PD to ensure the presence of the clearance 103. Stated another way, the root surfaces 124 of the sprocket 120 are undercut, i.e., moved radially inward as compared to the conventional root surfaces 24 of the conventional sprocket 20, and this feature, in combination with the hard contact between the chain link plates 146, 148 and the cushion rings 130 at locations 160 while the cushion rings 130 are in hard contact with the hubs 125a, 125b at locations 165 that are radially aligned with the locations 160, prevents any contact between the rollers 150 and the respective root surfaces 124 for all rollers 150 in the wrap θ. The clearance 103 is also apparent in FIG. 5D, which also shows both the first and second cushion rings 130 and the locations 160, 165 where the rings are in hard contact with the chain link plates 146 and hubs 125a, 125b, respectively.

Figure 4A:
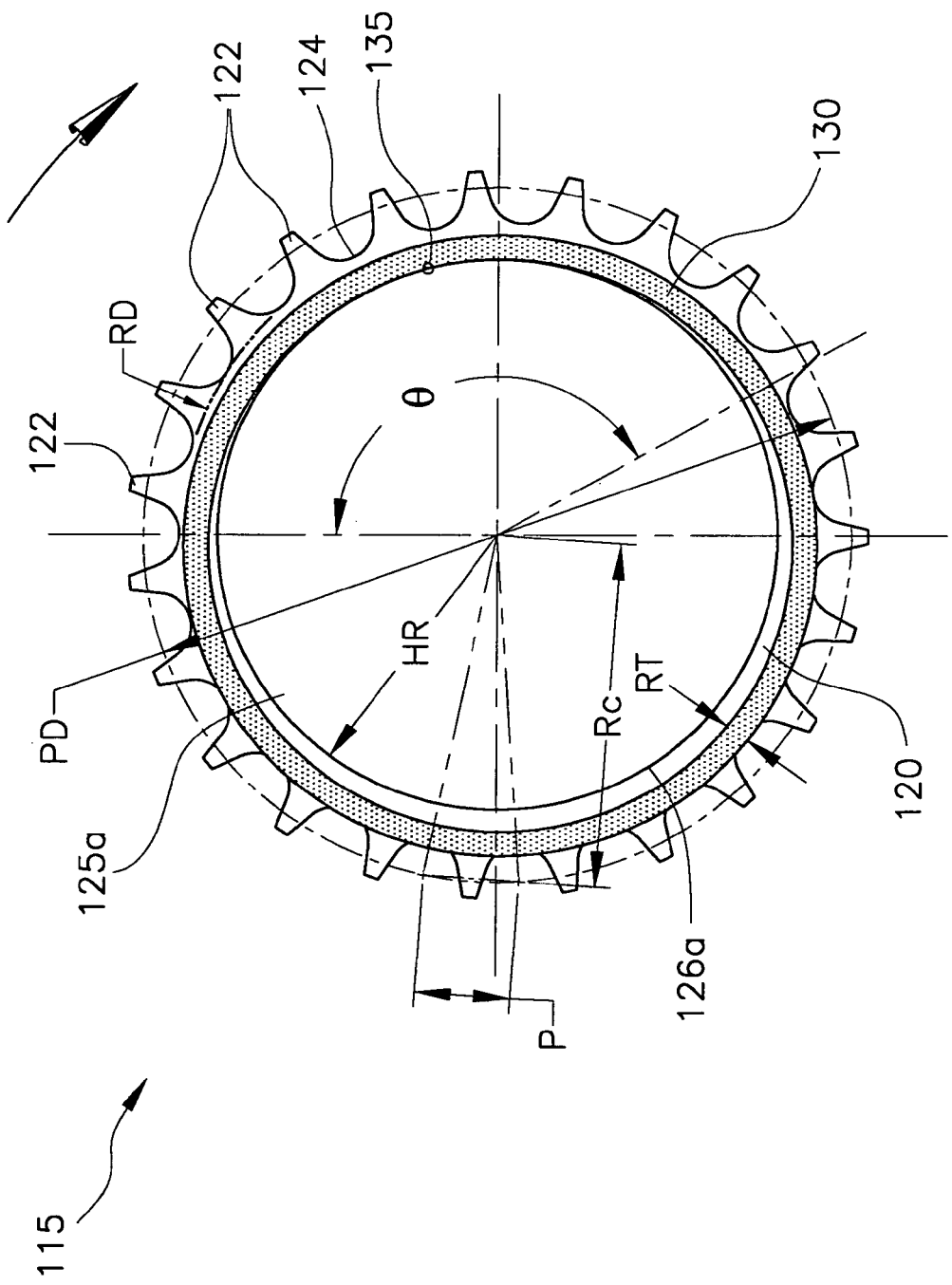
FIG. 4A illustrates the relationship of the cushion ring and sprocket hub for the sprocket assembly of FIG. 4 (the relationship is identical for the cushion ring and hub located on the opposite side of the cushion ring sprocket assembly)
Figure 5D:
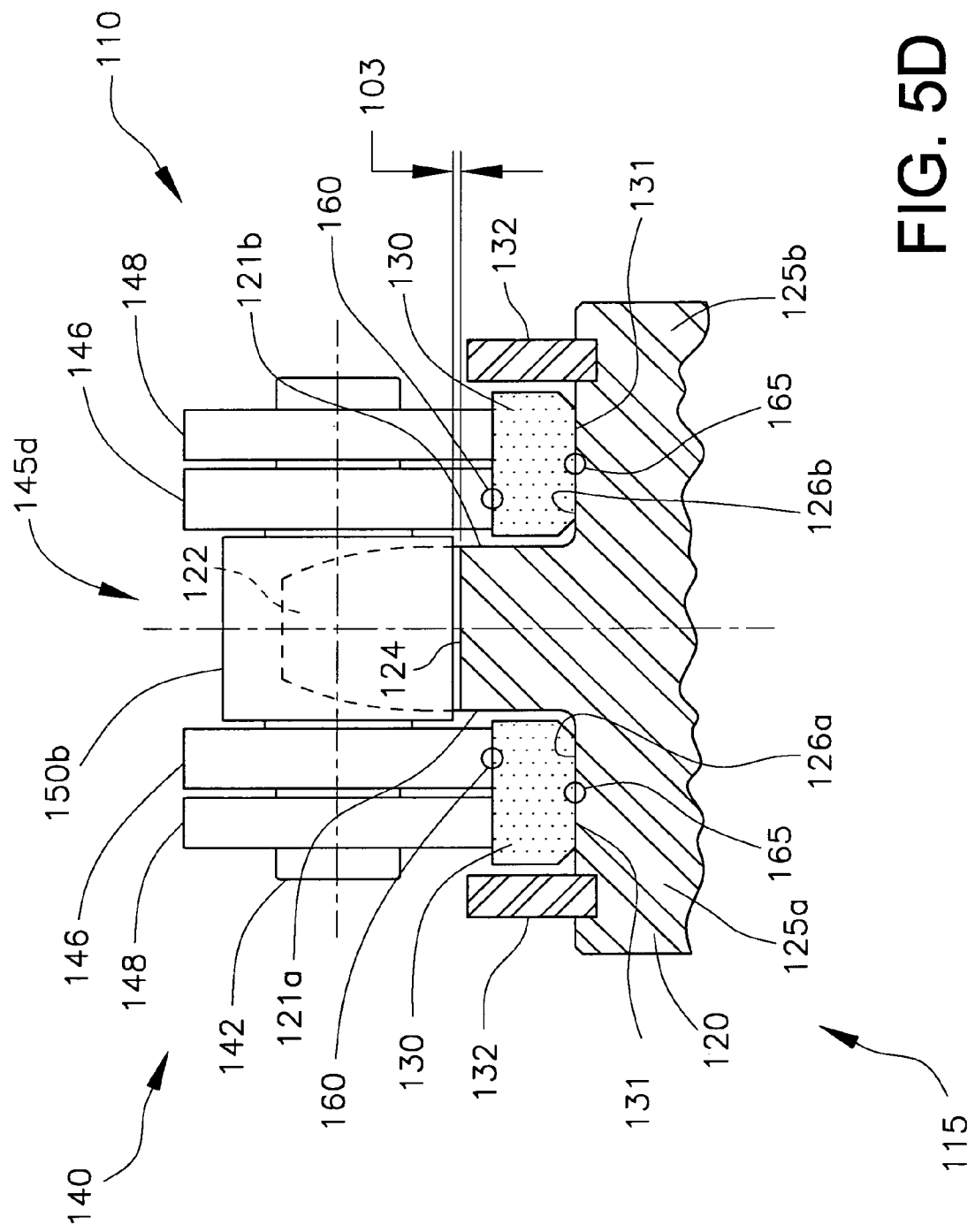
FIG. 5D is a section view of the sprocket and chain as taken at line 5D-5D of FIG. 5C to show the relationship of the chain and metal cushion rings during meshing engagement.

FIG. 4A shows the sprocket assembly 115 and a cushion ring 130 in its free, circular shape prior to the roller chain 140 being installed, and the cushion ring 130 is shown to be in hard contact with the cylindrical hub outside diameter 126a at the wrap mid-point 135 (the second cushion ring 130 installed on the opposite cylindrical hub 125b has the same circular shape when in its free state). Comparing FIG. 4A to FIG. 4, it is clear that the chain 140 deflects the cushion rings 130 throughout the wrap angle θ when the chain is tensioned.

With continuing reference to FIG. 4A, the hub radius HR for the hub outside diameters 126a, 126b and the radial thickness RT of the cushion rings 130 are both variable in order to design a sprocket assembly 115 according to the present invention. As such, a sprocket assembly 115 preferably satisfies the following relationships:

$$HR = R_C - RT - \frac{H_P}{2}$$

Where pitch chord radius $R_C$ (FIG. 4A) is defined as:

$$R_C = \frac{\sqrt{(PD)^2 - P^2}}{2}$$

and, $$PD = \frac{P}{\sin(180/N)}$$

where:
HR=Hub radius
RT=Cushion ring thickness
$R_C$=Pitch circle chord radius
$H_P$=Link plate height PD=Pitch diameter
P=Pitch
N=Number of sprocket teeth Those of ordinary skill in the art will note the only variables are HR and RT—all other factors, i.e., the pitch circle chord radius $R_C$, the chain link plate height $H_P$, the pitch diameter PD, the chain/sprocket pitch P, and the number of sprocket teeth N, will always be determined independently. Furthermore, RT will be determined as a function of the chain tension and drive dynamics.

With specific reference again to FIG. 4, it should be noted that the link plates 146, 148 for all link rows 145, 147 in the wrap θ are in hard contact with cushion rings 130 at points 160 for the full chain/sprocket build stack, i.e., for the theoretical case where the chain link pitch P matches the sprocket chordal pitch P and for all possible real-world tolerance stack conditions where the chain link pitch exceeds the sprocket chordal pitch.

FIGS. 5A-5C illustrate the progression of roller link row 145d as sprocket body 120 rotates in a clockwise direction until roller 150b as shown in FIG. 5C is at the instant of tangential meshing impact $I_F$ with the engaging flank 122a of tooth 122, thereby placing roller link row 145d at full mesh or engagement, with rollers 150a, 150b having their respective centers on the pitch diameter PD. The designation $I_F$ indicates the instant of tangential meshing contact between the roller 150b and its respective engaging flank 122a, while the indication FC associated with the rollers 150, 150a indicates the same location of contact with their respective engaging flanks 122a, at a later point in time as compared to the time of initial contact.

More specifically, referring first to FIG. 5B, roller 150b is shown prior to the instant of meshing impact $I_F$. Roller link plates 146 of roller link row 145d are in hard contact 160 with cushion rings 130, but the radially aligned portion of cushion ring inside diameters 131 are not yet in hard contact with the hub outside diameters 126a, 126b. Referring next to FIG. 5C, the cushion rings 130 will be further deflected as the roller 150b and link row 145d move into engagement at the onset of meshing but, for the reasons described above, this engagement will occur with tangential meshing impact $I_F$ only, with no undesired radial impact $I_R$ between the roller 150b and root surface 124. It is believed that radial impact $I_R$ associated with conventional systems (FIG. 2C) is a greater contributor to the meshing noise level of a roller chain drive than tangential meshing impact $I_F$.

FIG. 5D is a section view that illustrates the relationship of the meshing link row 145d to the cushion rings 130 with the link plates 146 of roller link row 145d shown to be in hard contact with—and deflecting—the cushion rings 130 at locations 160 and with the inner diameters 131 of the cushion rings 130 making hard contact with the outer diameters 126a, 126b of the respective hubs 125a, 125b at locations 165 that are radially aligned with locations 160. Roller 150b, although at the onset of meshing impact $I_F$, is shown in FIGS. 5C, 5D to have roller-root clearance 103 defined between itself and the root surface 124 and cannot make radial contact with root surface 124 due to the above-described structural relationships.

Figure 6A:
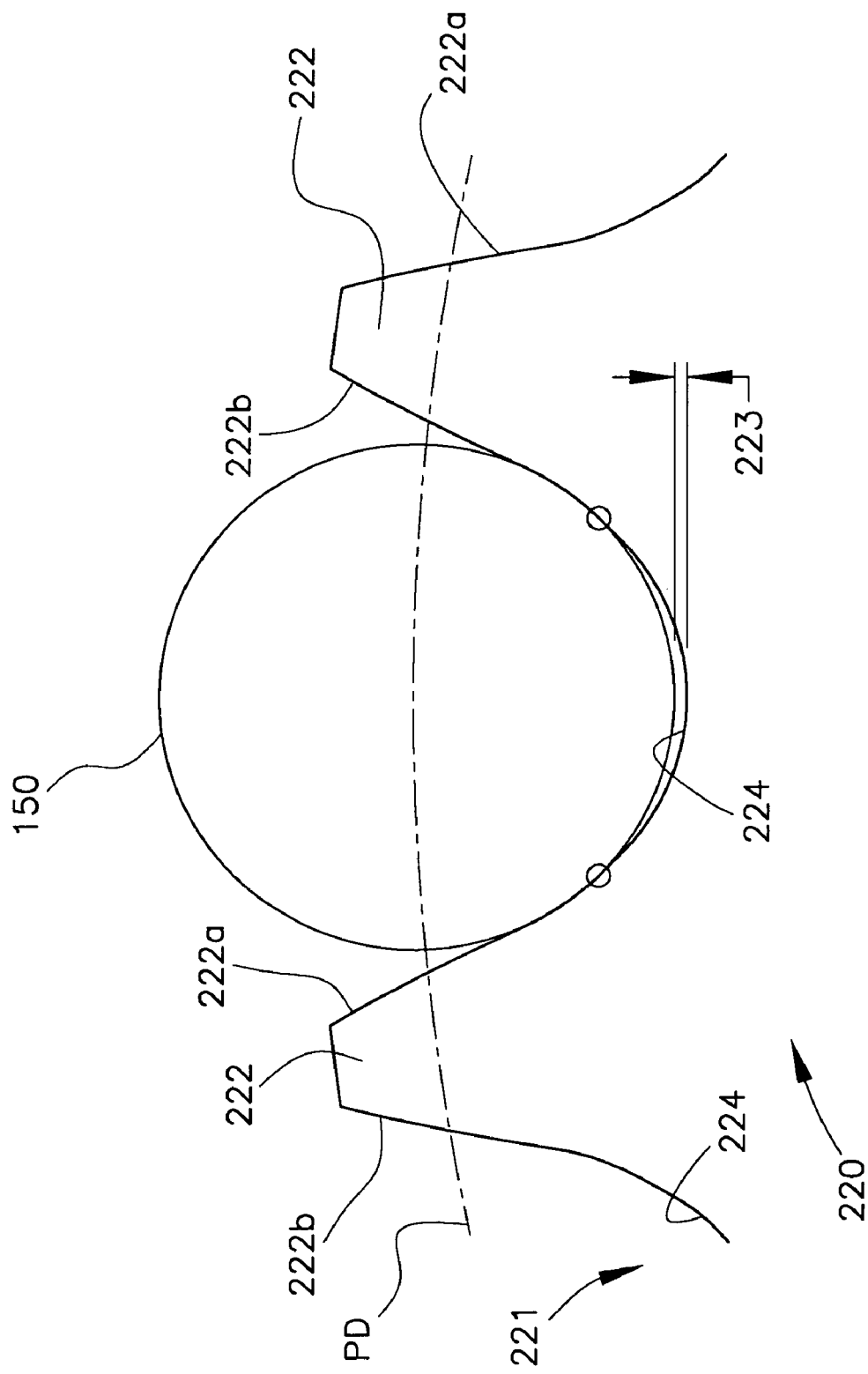
FIG. 6A partially illustrates an alternative sprocket body with an asymmetric tooth form that can be used to assemble a cushion ring sprocket assembly in accordance with the present invention.

FIG. 6A partially illustrates an alternative sprocket body 220 that can be used in place of the sprocket body 120 according to the present invention. The sprocket body 220 is identical to the above-described sprocket body 120, except as shown and/or described. The teeth 222 are asymmetric, with the engaging flanks 222a being steeper than the disengaging flanks 222b. The root surface 224 defined between successive teeth 222, i.e., connecting an engaging flank 222a to a disengaging flank 222b, is defined with "root relief" so that a chain roller 150 located in a tooth space 221 at a radially innermost position cannot contact at least a central portion the root surface 224 and, instead, bridges across at least a portion of the root surface 224, i.e., a clearance 223 is defined between the roller 150 and the root surface 224. Those of ordinary skill in the art with recognize from the above disclosure that the metal cushion rings 130 prevent the chain rollers 150 from moving inward to the reference position shown in FIG. 6A, but defining the root surface 224 with root relief as shown further ensures that a chain roller 150 cannot make a radial impact $I_R$ with the root surface 224.

Figure 6B:
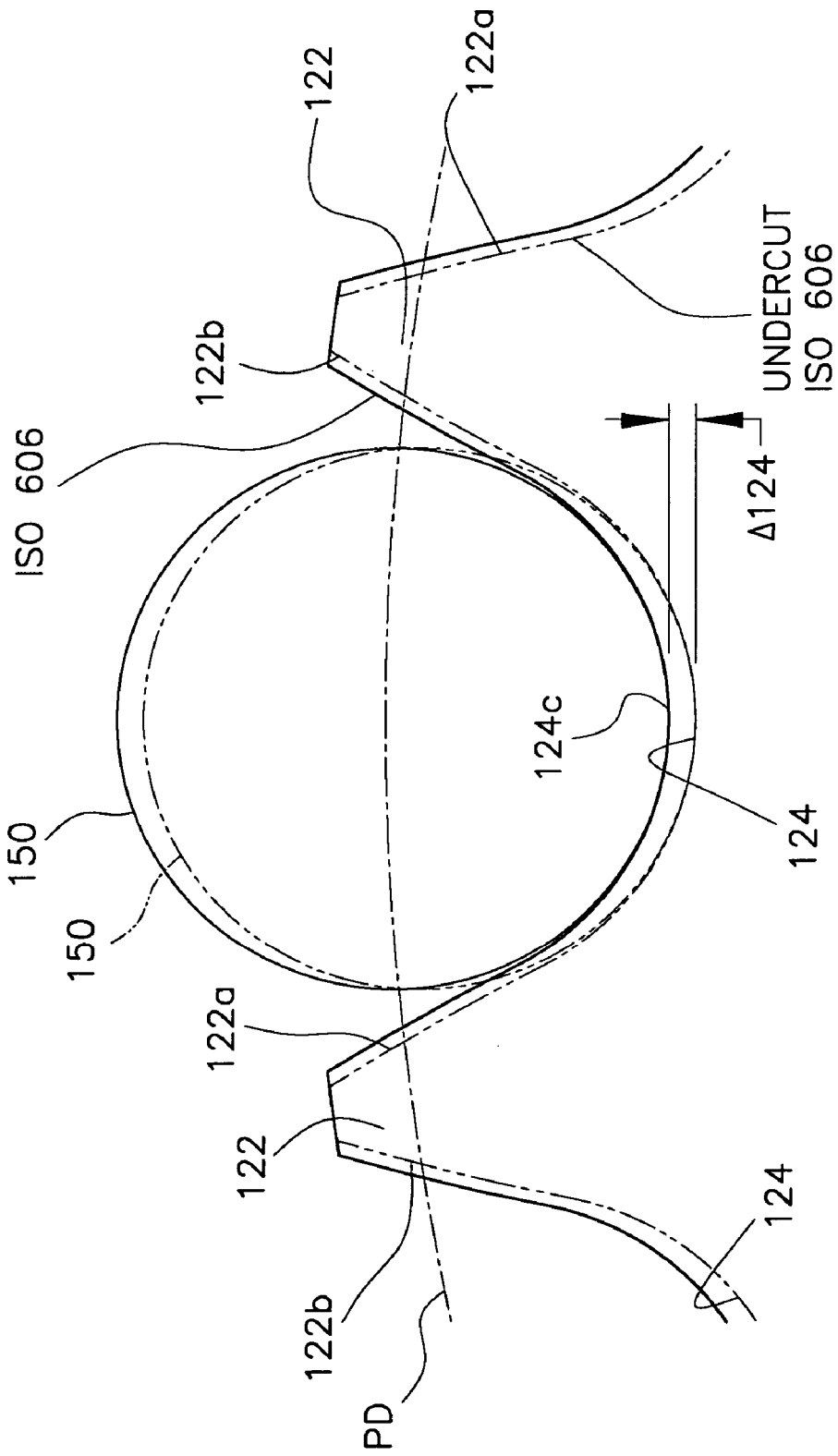
FIG. 6B illustrates a conventional tooth form overlaid with a tooth form defined in accordance with the present invention to illustrate the differences.

FIG. 6B is included to further illustrate a conventional tooth form ISO 606 with a tooth form UNDERCUT ISO 606 including teeth 122 defined in accordance with the present development, with the tooth forms overlaid for ease of comparison. It can be seen that, for the tooth form UNDERCUT ISO 606, the entire tooth form 122, including the root 124 and both the engaging and disengaging flanks 122a, 122b is reduced in size or undercut relative to the conventional tooth form. The result is that the root surface 124 is shifted inward from 124C for the conventional tooth form to the root surface 124 by a radial distance Δ124, without any corresponding inward shift of the intended pitch diameter PD. The roller 150 is shown centered on the pitch diameter PD and also in phantom lines for reference but, as noted above, the cushion rings 130 prevent the roller 150 from moving into the phantom-illustrated position in contact with the undercut root surface 124.

Figure 6C:
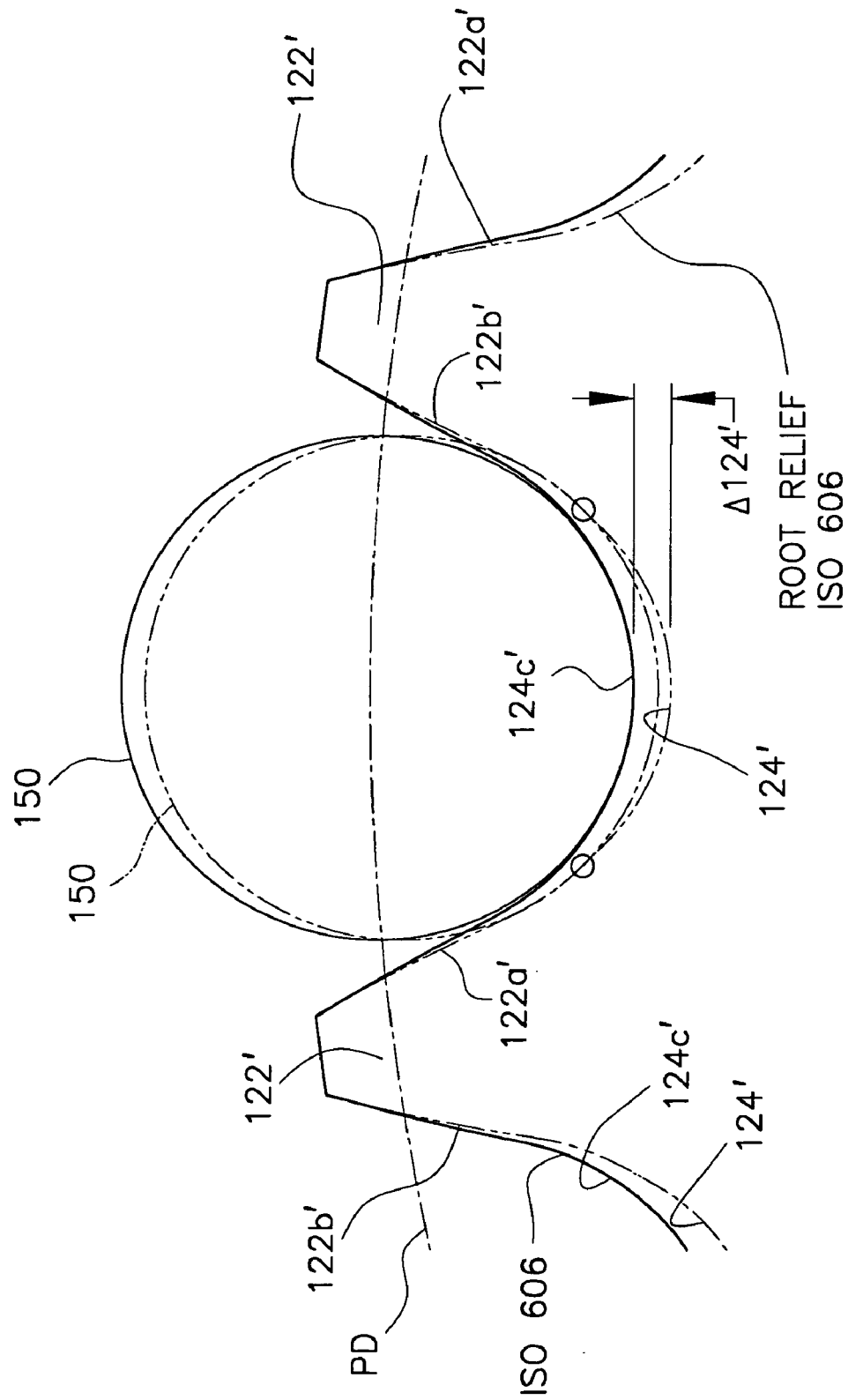
FIG. 6C illustrates the conventional tooth form of FIG. 6B overlaid with a second tooth form defined in accordance with the present invention to illustrate the differences.

FIG. 6C illustrates the conventional tooth form ISO 606 again, now overlaid with a second tooth form ROOT RELIEF ISO 606 including teeth 122' defined in accordance with another embodiment of the present development. For the tooth form ROOT RELIEF ISO 606, the root surface 124' is reduced in size or undercut relative to the root surface 124C' of the conventional tooth form, while the engaging and disengaging flanks 122a', 122b' are also relieved relative to the conventional tooth form, but less so as compared to the tooth form 122 of FIG. 6B which improves tooth strength. In a preferred embodiment, this is accomplished by defining the root surface 124' with a smaller radius as compared to the conventional root surface 124C', which leads to the illustrated profiles for the engaging and disengaging flanks 122a', 122b'. This again leads to the inward shift of the root surface 124' relative to the conventional root surface 124C' by a distance Δ124', without any corresponding inward shift of the intended pitch diameter PD. Here, again, the roller 150 is shown centered on the pitch diameter PD and also in phantom lines for reference but, as noted above, the cushion rings 130 prevent the roller 150 from moving into the phantom-illustrated position. Also, the radius of the root surface 124' is smaller than the radius of the roller outside diameter, which ensures that the roller can never make radial contact with the root surface 124', even if it could move to the position illustrated in FIG. 6C.

Figure 7:
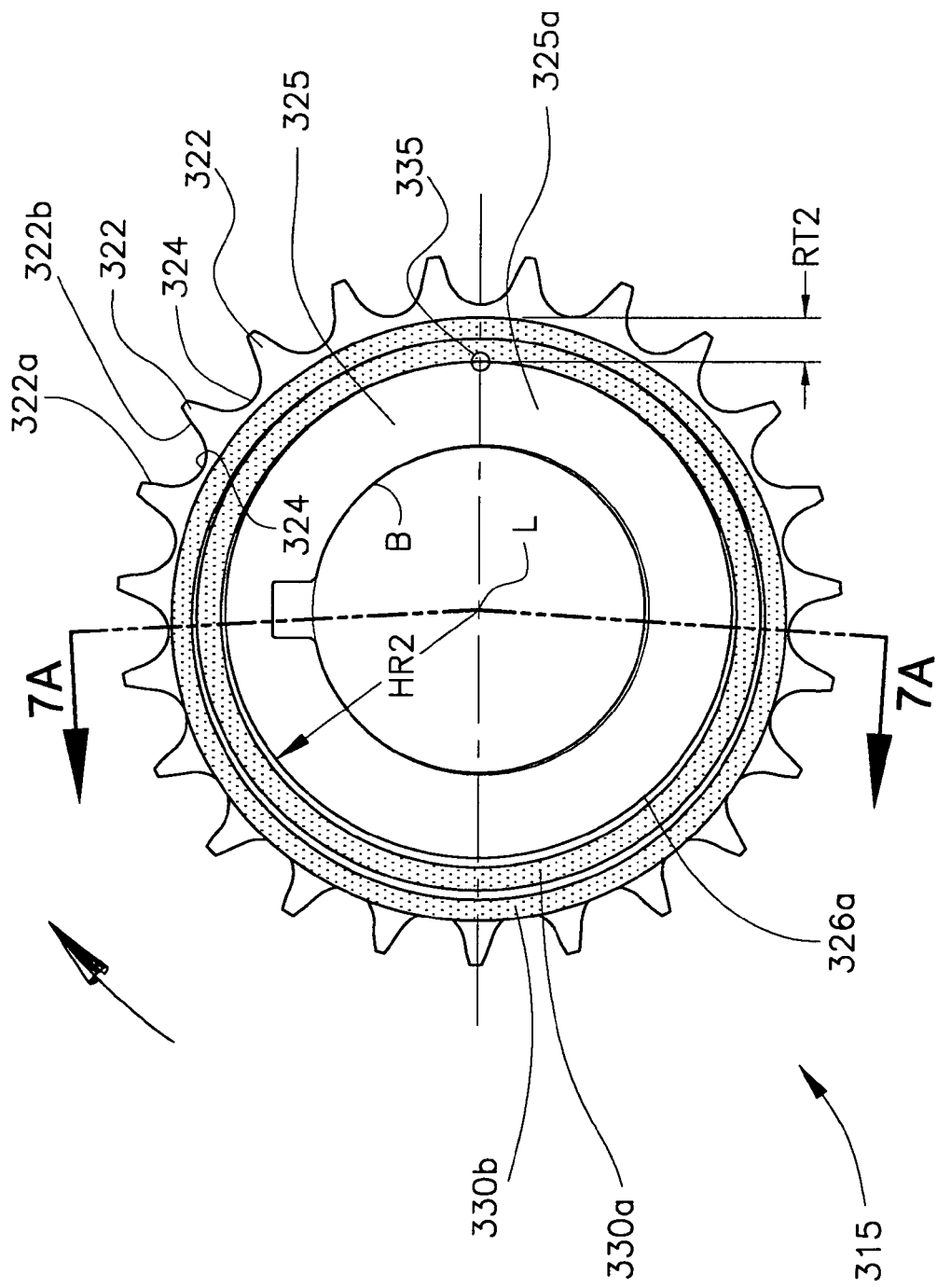
FIG. 7 illustrates a multiple cushion ring sprocket assembly formed in accordance with another alternative embodiment of the present invention.
Figure 7A:
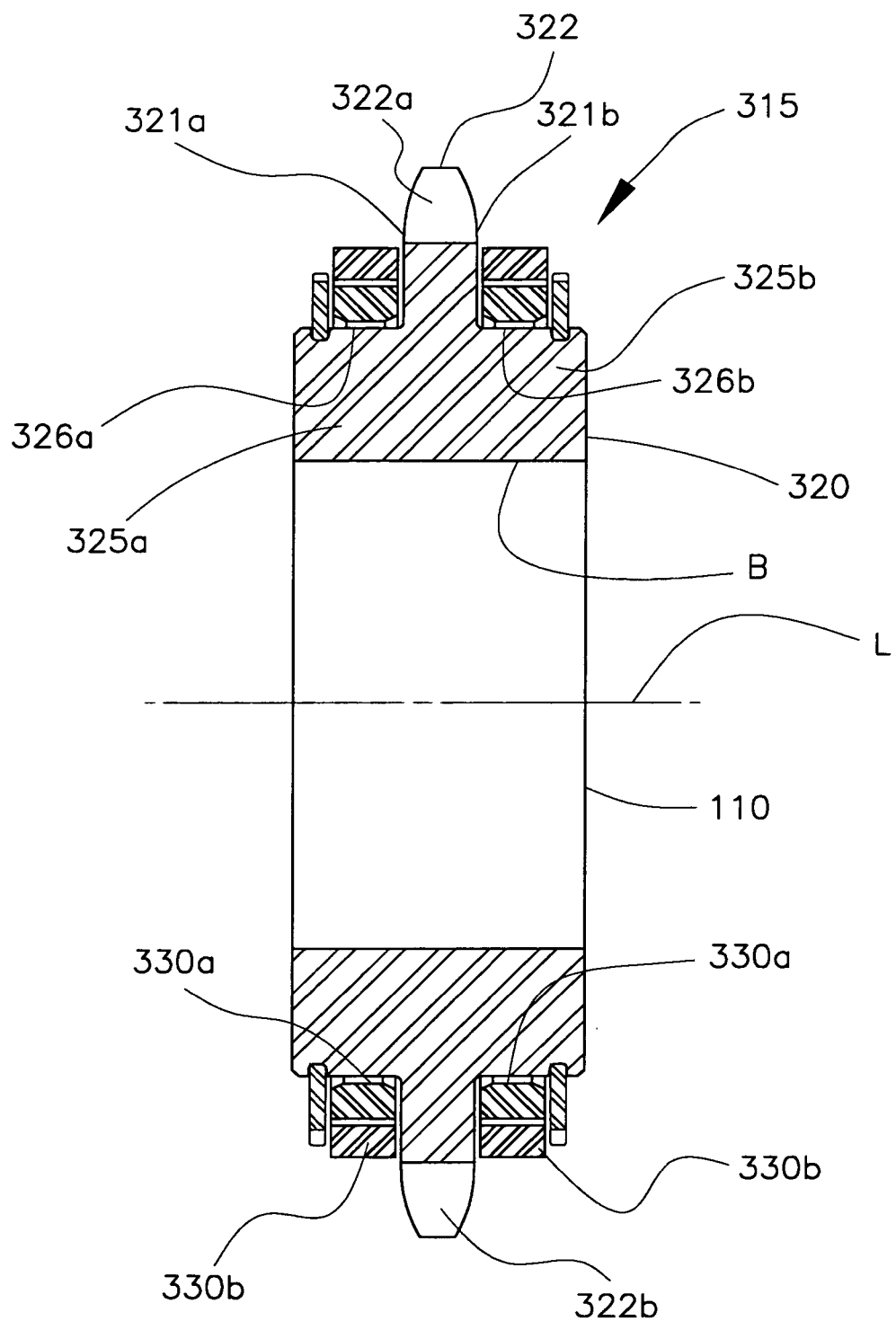
FIG. 7A is a sectional view as taken along line 7A-7A of FIG. 7.

FIGS. 7 and 7A illustrate a multiple cushion ring sprocket assembly 315 formed in accordance with another alternative embodiment of the present invention (the retaining clip 332 is not shown in FIG. 7 in order to reveal underlying components). The sprocket body 320 is identical to the sprocket body 120 (or 220), but at least two metal cushion rings 330a, 330b are provided adjacent the opposite axial faces 321a, 321b of the sprocket body 320 on the respective hubs 325a, 325b. The inner cushion rings 330a float eccentrically on the hubs 325a, 325b, while the outer cushion rings 330b float eccentrically on the respective inner cushion rings 330a.

Each set of cushion rings 330a, 330b is dimensioned so that when the rings 330a, 330b are fully deflected, i.e., when there is hard contact between the inner and outer rings 330a, 330b, and also hard contact between the inner rings 330a and the outer diameters 326a, 326b of hubs 325a, 325b, the chain rollers 150 associated with link plates 146, 148 that are in hard contact with the outer cushion rings 330b cannot make radial contact with the undercut root surface 324. In such case, the ring sets 330a, 330b ensure that a chain roller 150 can never make radial contact with the root surface 324. In particular, the hub radius HR2 and the combined thickness of the multiple cushion rings RT2 defines a swing radius when the rings are in hard contact with each other and when the innermost ring 330a on each side of the sprocket is in hard contact with the respective hub 325a, 325b. As described above, the swing radius is dimensioned by controlling the hub radius HR2 and combined ring thickness RT2 such that when inner edges of chain link plates 146, 148 are located at the swing radius (at the midpoints of the link plates), the centers of the chain rollers 150 are located on the pitch diameter and the rollers are spaced above the respective root surfaces 324.

This multiple ring configuration permits greater total ring deflection, resulting in reduced transverse vibration in the chain span and better chain span control since the chain link plates will contact the outer cushion rings 330b earlier in the meshing process as the chain approaches the sprocket to provide an initial damping of the movement of the rollers 150, while the inner cushion rings 330a complete the damping process in a staged fashion. The enhanced chain span control results in reduced roller-sprocket impact at the onset of meshing. Multiple rings also allow the cushioning effect of the ring sets 330a, 330b to be tuned for specific chain drive applications. As mentioned above, only the outer rings 330b deflect initially to provide the initial damping rate, until their inside diameters come into contact with the outside diameters of the inner rings 330a, respectively, and at this point the damping rate will increase since both rings must then deflect in order for the chain to continue to move radially inward. Another main advantage of this multiple cushion ring configuration is the increased damping without corresponding increases in stress in the cushion rings 330a, 330b.

The invention has been described with reference to preferred embodiments. Modifications and alterations will occur to those of ordinary skill in the art to which the invention pertains, and it is intended that the invention be construed as encompassing all such modifications and alterations according to the following claims as construed literally and/or according to the doctrine of equivalents.

The invention claimed is:

1. A sprocket assembly comprising:
a body including a ring of teeth and first and second hubs that project axially outward relative to opposite first and second faces of said ring of teeth, said first and second hubs defining respective first and second outside diameters each having a radius HR, and said ring of teeth comprising N teeth separated from each other by respective tooth spaces, said teeth each comprising engaging and disengaging flanks, wherein respective root surfaces are located between engaging and disengaging flanks of successive teeth, said sprocket body defining a chordal pitch P, a pitch diameter PD and a pitch chord radius $R_C$ and adapted to mesh with an associated chain having a link plate height $H_P$;
first and second sets of metal cushion rings eccentrically captured on said first and second hubs, respectively, said first and second sets of cushion rings having a radial thickness RT;

wherein:

$$HR = R_C - RT - \frac{H_P}{2}$$

and, $$R_C = \frac{\sqrt{(PD)^2 - P^2}}{2}$$

and, $$PD = \frac{P}{\sin(180/N)}$$

wherein said root surfaces are each undercut relative to said pitch diameter PD so that rollers/bushings of the associated chain cannot contact the undercut root surfaces when said chain is in hard contact with respective outside diameter locations of said first and second sets of metal cushion rings and when said outside diameter locations are respectively radially aligned with respective inside diameter locations of said first and second sets of metal cushion rings that are respectively in hard contact with said first and second hubs.

2. The sprocket assembly as set forth in claim 1, wherein said first and second sets of metal cushion rings each comprises a single metal cushion ring wherein said radial thickness RT is the radial thickness of each single cushion ring.

3. The sprocket assembly as set forth in claim 1, wherein said first and second sets of metal cushion rings each comprises multiple metal cushion rings, wherein said radial thickness RT is the combined radial thicknesses of the multiple cushion rings.

4. A chain drive system comprising:
a sprocket assembly comprising: (i) a body including a ring of teeth and first and second hubs that project axially outward relative to opposite first and second faces of said ring of teeth, said first and second hubs defining respective first and second outside diameters, and said ring of teeth comprising a plurality of teeth separated from each other by respective tooth spaces, said teeth each comprising engaging and disengaging flanks, wherein respective root surfaces are located between engaging and disengaging flanks of successive teeth, wherein each of said root surfaces is undercut relative to a pitch diameter defined by said sprocket assembly body; (ii) first and second sets of metal cushion rings eccentrically captured on said first and second hubs, respectively;
a chain drivingly engaged with said sprocket assembly, said chain comprising: (i) first and second rollers/bushings located in first and second tooth spaces and fully meshed with said sprocket assembly such that respective centers of said first and second rollers/bushings are located on said pitch diameter; and, (ii) first and second link plates between which said first and second rollers/bushings are located, said first and second link plates including respective first and second link plate inner edges;
wherein respective first and second inside diameter contact locations of said first and second sets of cushion rings are in hard contact with said first and second hubs, respectively, and said first and second link plate inner edges are respectively in hard contact with first and second outside diameter locations of said first and second sets of cushion rings that are respectively radially aligned with said first and second inside diameter contact locations, such that first and second clearances are defined between said first and second fully meshed rollers/bushings and said first and second root surfaces, respectively.

5. The chain drive system as set forth in claim 4, wherein said undercut first and second root surfaces comprise respective first and second root relief surfaces defined by respective first and second root radii that are smaller than a radius of an outer diameter of said first and second rollers/bushings.

6. The chain drive system as set forth in claim 4, wherein said first and second sets of metal cushion rings each comprise only a single metal cushion ring.

7. The chain drive system as set forth in claim 6, wherein:
first and second cushion ring sets define respective first and second radial thicknesses that are equal to each other;
a first swing radius is defined by a radius of said first hub outside diameter plus said first radial thickness of said first cushion ring set;
a second swing radius is defined by a radius of said second hub outside diameter plus said second radial thickness of said second cushion ring set; and,
said first and second clearances are defined when a midpoint of said first link plate inner edge is located radially at said first swing radius and when a midpoint of said second link plate inner edge is located radially at said second swing radius.

8. The chain drive system as set forth in claim 4, wherein said first and second sets of metal cushion rings each comprise multiple metal cushion rings.

9. The chain drive system as set forth in claim 8, wherein:
first and second cushion ring sets define respective first and second radial thicknesses that are equal to each other;
a first swing radius is defined by a radius of said first hub outside diameter plus said first radial thickness of said first cushion ring set;
a second swing radius is defined by a radius of said second hub outside diameter plus said second radial thickness of said second cushion ring set; and,
said first and second clearances are defined when a midpoint of said first link plate inner edge is located radially at said first swing radius and when a midpoint of said second link plate inner edge is located radially at said second swing radius.

10. The chain drive system as set forth in claim 4, wherein said rollers/bushings comprise rotatable or non-rotatable rollers.

11. The chain drive system as set forth in claim 4, wherein said first and second hub outside diameters each define a radius HR, said plurality of teeth includes a total of N teeth, and wherein said chain defines a link plate height $H_P$, said sprocket body defining a chordal pitch P, a pitch diameter PD and a pitch chord radius $R_C$, wherein:

$$HR = R_C - RT - \frac{H_P}{2}$$

and, $$R_C = \frac{\sqrt{(PD)^2 - P^2}}{2}$$

and, $$PD = \frac{P}{\sin(180/N)}.$$

* * * * *